(12) United States Patent
Ritter et al.

(10) Patent No.: US 9,958,086 B2
(45) Date of Patent: May 1, 2018

(54) FAUCET ASSEMBLY

(71) Applicant: Kohler Co., Kohler, WI (US)

(72) Inventors: David H. Ritter, Kohler, WI (US);
Brian S. Core, Fond du Lac, WI (US)

(73) Assignee: KOHLER CO., Kohler, WI (US)

( * ) Notice: Subject to any disclaimer, the term of this patent is extended or adjusted under 35 U.S.C. 154(b) by 0 days. days.

(21) Appl. No.: 15/414,755

(22) Filed: Jan. 25, 2017

(65) Prior Publication Data

US 2017/0211721 A1 Jul. 27, 2017

Related U.S. Application Data

(60) Provisional application No. 62/287,215, filed on Jan. 26, 2016.

(51) Int. Cl.
| | |
|---|---|
| *E03B 1/00* | (2006.01) |
| *F16K 31/60* | (2006.01) |
| *E03C 1/04* | (2006.01) |
| *F16K 3/02* | (2006.01) |
| *F16K 3/08* | (2006.01) |
| *F16K 11/00* | (2006.01) |
| *F16K 27/04* | (2006.01) |

(52) U.S. Cl.
CPC .......... *F16K 31/602* (2013.01); *E03C 1/0412* (2013.01); *F16K 3/0272* (2013.01); *F16K 3/08* (2013.01); *F16K 19/006* (2013.01); *F16K 27/045* (2013.01)

(58) Field of Classification Search
CPC ................. F16K 31/602; E03C 1/0412; Y10T 137/6014; Y10T 137/9464
USPC .... 137/315.11, 315.12, 315.13, 315.15, 603, 137/801
See application file for complete search history.

(56) References Cited

U.S. PATENT DOCUMENTS

| | | | |
|---|---|---|---|
| 3,726,316 A | 4/1973 | Moen | |
| 3,773,079 A | 11/1973 | Moen | |
| 3,782,417 A | 1/1974 | Moen | |
| 3,788,356 A | 1/1974 | Moen | |
| 4,064,900 A * | 12/1977 | Schmitt | F16K 19/00 137/315.12 |
| 4,109,672 A * | 8/1978 | Szemeredi | F16K 27/02 137/315.13 |

(Continued)

FOREIGN PATENT DOCUMENTS

| | | |
|---|---|---|
| DE | 89 09 346 | 12/1989 |
| DE | 19639320 A1 | 3/1998 |

(Continued)

*Primary Examiner* — Reinaldo Sanchez-Medina
(74) *Attorney, Agent, or Firm* — Foley & Lardner LLP

(57) ABSTRACT

A faucet assembly includes a non-metallic valve body, a valve, a handle adapter, and a retaining clip. The non-metallic valve body includes a longitudinal opening disposed therein and a slot disposed within a side portion thereof. The valve is at least partially disposed within the longitudinal opening. The valve includes a body and a stem extending upwardly from the body, and the stem is configured to rotate relative to the body. The handle adapter is removably coupled to the stem and is rotatably coupled to the non-metallic valve body. The retaining clip is removably inserted into the slot of the non-metallic valve body to limit longitudinal movement of the valve within the non-metallic valve body.

18 Claims, 20 Drawing Sheets

(56) References Cited

U.S. PATENT DOCUMENTS

| | | | |
|---|---|---|---|
| 4,134,420 A | | 1/1979 | Okonowitz |
| RE30,559 E | * | 3/1981 | Schmitt .................. F16K 11/22 |
| | | | 137/315.12 |
| 5,778,921 A | | 7/1998 | Ko |
| 5,918,626 A | | 7/1999 | Strong et al. |
| 5,937,892 A | | 8/1999 | Meisner et al. |
| 6,073,972 A | | 6/2000 | Rivera |
| 7,406,980 B2 | | 8/2008 | Pinette |
| 7,607,639 B2 | | 10/2009 | Chen et al. |
| 7,766,043 B2 | | 8/2010 | Thomas et al. |
| 7,793,677 B2 | | 9/2010 | Pinette |
| 7,806,141 B2 | | 10/2010 | Marty et al. |
| 7,819,137 B2 | | 10/2010 | Nelson et al. |
| 8,074,893 B2 | * | 12/2011 | Mace .................. G05D 23/1353 |
| | | | 236/12.11 |
| 8,240,326 B2 | | 8/2012 | Kacik et al. |
| 8,297,305 B2 | | 10/2012 | Ritter et al. |
| 8,365,770 B2 | | 2/2013 | Thomas et al. |
| 8,453,669 B2 | | 6/2013 | Veros et al. |
| 8,453,942 B2 | | 6/2013 | Jager |
| 8,464,748 B2 | | 6/2013 | Pinette |
| 8,469,056 B2 | | 6/2013 | Marty et al. |
| 8,651,132 B1 | | 2/2014 | Hu |
| 8,689,818 B2 | | 4/2014 | Marty et al. |
| 8,695,625 B2 | | 4/2014 | Marty et al. |
| 8,739,813 B2 | | 6/2014 | Moore et al. |
| 8,739,826 B2 | | 6/2014 | Thomas et al. |
| 8,746,273 B2 | | 6/2014 | Yang et al. |
| 8,800,962 B2 | | 8/2014 | Ritter et al. |
| 8,881,755 B2 | | 11/2014 | Thomas et al. |
| 2004/0182459 A1 | * | 9/2004 | Klein ........................ E03C 1/04 |
| | | | 137/801 |
| 2009/0000026 A1 | | 1/2009 | Hanson |
| 2010/0170577 A1 | | 7/2010 | Liu et al. |
| 2011/0073205 A1 | * | 3/2011 | Marty .................. E03C 1/0403 |
| | | | 137/801 |
| 2012/0273075 A1 | | 11/2012 | Pitsch et al. |
| 2013/0042925 A1 | | 2/2013 | Ritter et al. |
| 2013/0146164 A1 | | 6/2013 | Thomas et al. |
| 2013/0186482 A1 | | 7/2013 | Veros et al. |
| 2013/0263936 A1 | | 10/2013 | Devries et al. |
| 2014/0060686 A1 | | 3/2014 | Kemp et al. |
| 2014/0239543 A1 | | 8/2014 | Thomas et al. |
| 2014/0261747 A1 | | 9/2014 | Bares et al. |
| 2015/0152975 A1 | * | 6/2015 | Jonte .................... E03C 1/0412 |
| | | | 251/208 |

FOREIGN PATENT DOCUMENTS

| | | |
|---|---|---|
| DE | 10 2007 043 309 | 4/2009 |
| GB | 1 142 389 | 2/1969 |
| WO | WO-2008/031431 A1 | 3/2008 |

\* cited by examiner

FAUCET ASSEMBLY

CROSS-REFERENCE TO RELATED PATENT APPLICATIONS

This application claims the benefit of and priority to U.S. Provisional Application No. 62/287,215, filed Jan. 26, 2016, the entire disclosure of which is hereby incorporated by reference.

BACKGROUND

The present application relates generally to faucet assemblies. In particular, this application relates to widespread and centerset faucet assemblies.

Generally speaking, widespread and centerset faucet assemblies typically include two separate valve bodies associated with a hot water source and a cold water source, respectively. The valve bodies can hold a valve, such as a fluid mixing valve, to control the amount of water delivered to a user from the two water sources. One water source may be termed "hot," and the other "cold," depending on the temperature of the water sources. A handle can be removably coupled to each of the valves to allow a user to control the temperature and flow rate of a flow of water exiting the faucet assembly. The separate valve bodies can be joined together by a connecting member, sometimes referred to as a waterway connector, which can facilitate mixing of hot and cold water from the two different water sources. A spout or fluid conduit can extend from the waterway to deliver mixed water to a user.

In many widespread and centerset faucet assemblies, however, the fluid mixing valves are retained within the respective valve bodies by either threaded engagement between the valve and the valve body, or by a nut threadably engaging the valve body to sandwich the mixing valve therein. Both of these approaches are undesirable, because it is time consuming to assemble the valves within the respective valve bodies, which can be costly to manufacture.

Additionally, widespread and centerset faucets typically have bodies (also known as yokes) constructed from a metallic material. The yokes or bodies then provide undesirable metallic surface contact with the water flow. This metallic surface contact can lead to corrosion or degradation of the components of the faucet as well as potential contamination of the water flow.

Lastly, many of the valves used in widespread and centerset faucet assemblies typically incorporate an integrated stop feature or mechanism to establish the end point of valve rotation. For example, the rotation of the individual valves may be mechanically limited by a structural feature located within the valves. Limiting the rotation of the valves prevents a user from damaging the valves by operating them outside of their intended operating range.

SUMMARY

One embodiment of the present disclosure relates to a faucet assembly. The faucet assembly includes a non-metallic valve body, a valve, a handle adapter, and a retaining clip. The non-metallic valve body includes a longitudinal opening disposed therein and a slot disposed within a side portion thereof. The valve is at least partially disposed within the longitudinal opening. The valve includes a body and a stem extending upwardly from the body, and the stem is configured to rotate relative to the body. The handle adapter is removably coupled to the stem and is rotatably coupled to the non-metallic valve body. The retaining clip is removably inserted into the slot of the non-metallic valve body to limit longitudinal movement of the valve within the non-metallic valve body.

Another embodiment relates to a faucet assembly including a non-metallic valve body, a valve, a handle adapter, and a retaining clip. The non-metallic valve body includes a central longitudinal opening disposed therein and a slot disposed within a side portion thereof. The valve is at least partially disposed within the central longitudinal opening. The valve includes a body and a stem extending upwardly from the body, and the stem is configured to rotate relative to the body. The handle adapter is removably coupled to the stem and is rotatably coupled to the non-metallic valve body. The handle adapter is configured to control rotational movement of the stem. The retaining clip is slidably received within the slot of the non-metallic valve body to retain the valve along a longitudinal direction within the non-metallic valve body. The retaining clip is accessible at an outer surface of the valve body.

Another embodiment relates to a faucet assembly including a non-metallic valve body, a valve, a handle adapter, and a retaining clip. The non-metallic valve body has a longitudinal opening disposed therein and a slot disposed within a side portion thereof. The valve is at least partially disposed within the longitudinal opening, and includes a body and a stem extending upwardly from the body. The stem is configured to rotate relative to the body. The handle adapter is removably coupled to the stem and is rotatably coupled to the non-metallic valve body. The retaining clip is removably inserted into the slot of the non-metallic valve body to retain the valve within the non-metallic valve body. The body of the valve is disposed below the retaining clip so as to limit longitudinal movement of the valve.

It is to be understood that both the foregoing general description and the following detailed description are exemplary and explanatory only, and are not restrictive of the concepts as claimed.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology used is for the purpose of description only and should not be regarded as limiting.

Figure 1:
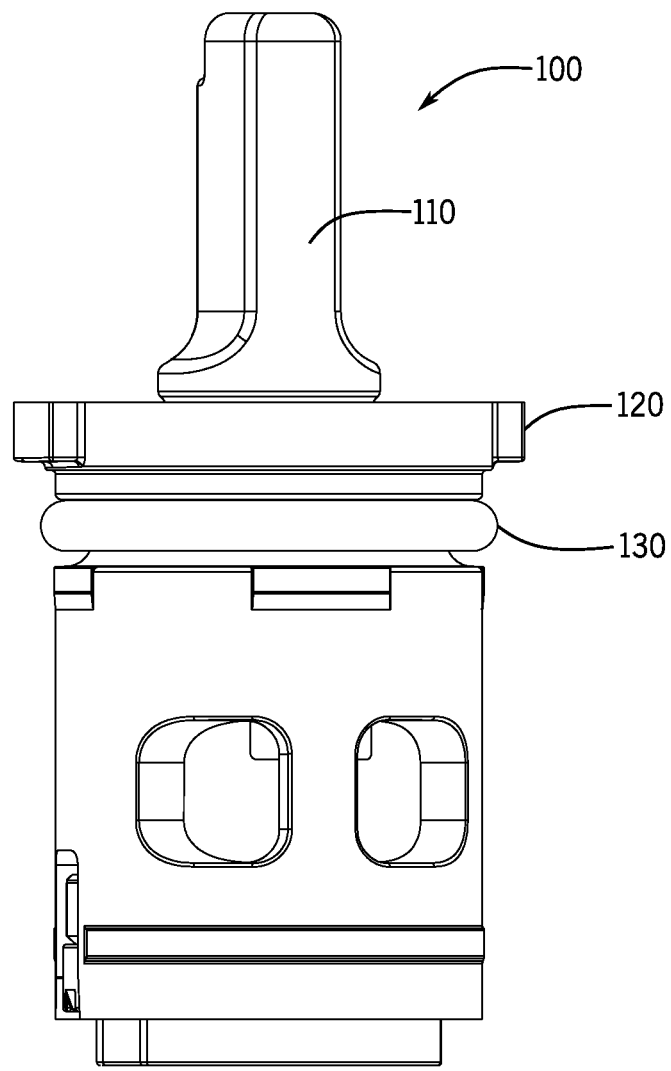
FIG. 1 is a perspective view of a valve, according to an exemplary embodiment of the present disclosure.
Figure 3:
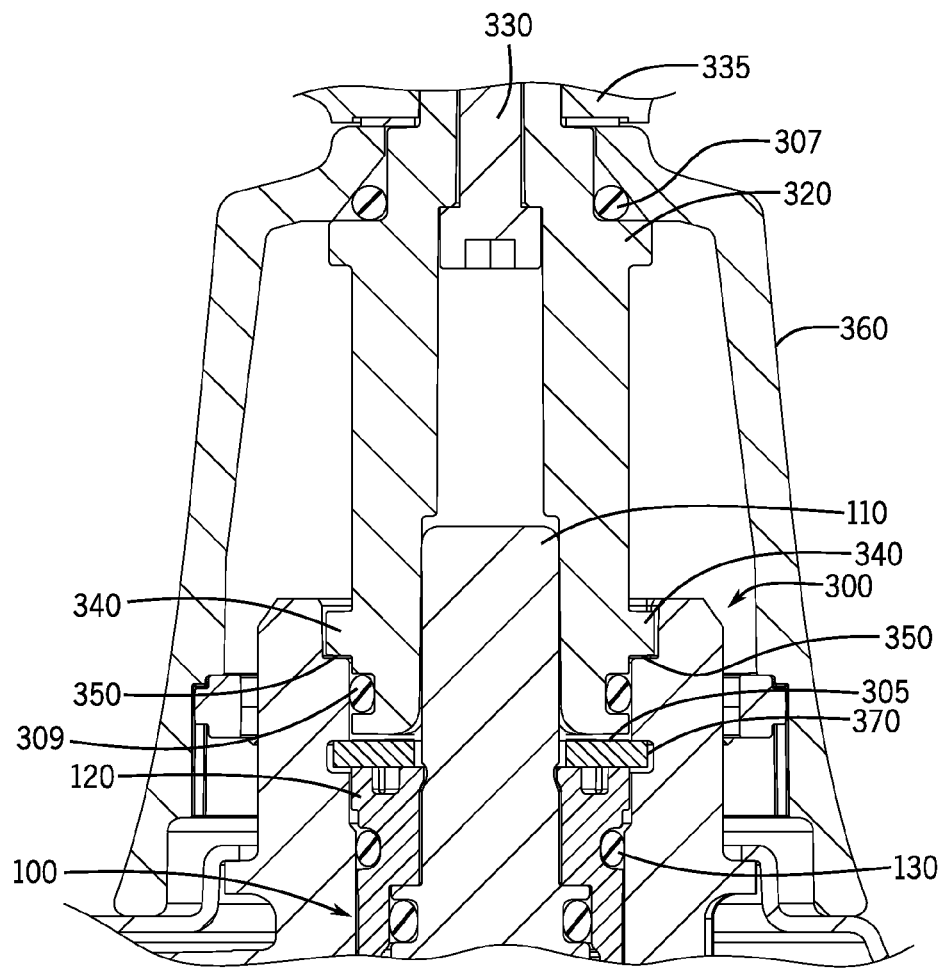
FIG. 3 is a cross-sectional view of a faucet assembly, according to an exemplary embodiment of the present disclosure.
Figure 4:
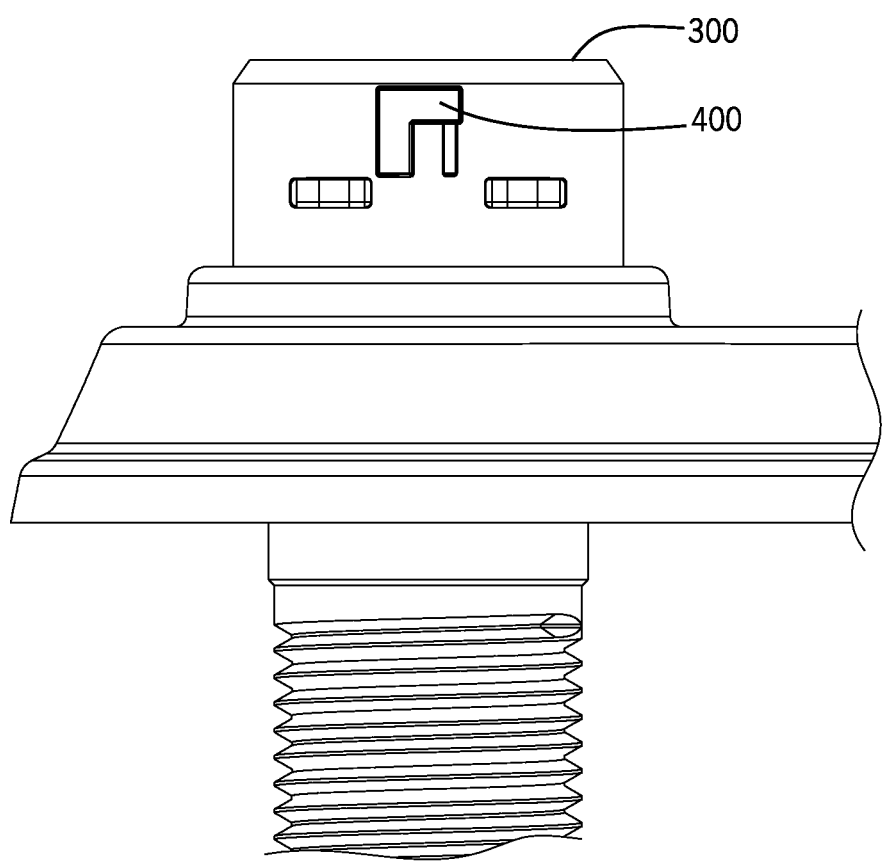
FIG. 4 is a profile view of a yoke for the faucet assembly shown in FIG. 3, according to an exemplary embodiment of the present disclosure.

Referring generally to FIG. 1 and FIGS. 3-4, a valve (e.g., valve cartridge, valve assembly, etc.), shown as centerset valve 100, for use in a faucet includes, among other components, a valve stem, shown as valve stem 110, a body, shown as valve body 120, and a seal, shown as seal 130. The centerset valve 110 is intended to be manipulated (e.g., rotated, etc.), through the manipulation of valve stem 110, to assist a user in obtaining a desired temperature and flow rate of water at an outlet of the faucet. In particular, the valve stem 110 is configured to rotate relative to the valve body 120 to control water flow. The valve stem 110 extends upwardly from the valve body 120. Seal 130 may be an o-ring (e.g., packing, toric joint, gasket, spacer, loop, seal, etc.) which may be constructed out of any suitable material including, for example, nitrile, Buna-N nitrile, nitrile butadiene rubber (NBR), perfluoroelastomer (FFKM), vinylidene fluoride and hexafluoropropylene (Viton®), fluoroelastomer (FKM), fluorocarbon, silicone, tetrafluoroethylene (TFE), Neoprene®, fluorinated ethylene propylene (FEP), polytetrafluoroethylene (PTFE) (Teflon®), perfluoroalkoxy alkane (PFA), and other suitable materials. According to various embodiments, centerset valve 100 is mounted within a body of the faucet. In some embodiments, centerset valve 100 is a dry stem valve.

Traditionally, the body and/or yoke of the faucet for receiving the centerset valve 110 is constructed from a metallic material (e.g., brass, etc.). In application, utilizing metallic valve bodies is disadvantageous, because water flow may come in direct contact with the metallic surfaces throughout the life of the faucet. This may lead to increased corrosion and degradation of the faucet and associated components. Over time, the metallic surfaces which corrode or degrade may discharge particulates into the water flow which may clog pipes, valves, aerators, or drains, which may be potentially dangerous to human consumption. Additionally, traditional metallic valve bodies are typically heavy and costly to manufacture. Accordingly, it is advantageous to utilize a polymeric valve body (i.e., a non-metallic valve body) in a faucet assembly for at least the reasons previously stated. The polymeric valve body may be constructed from any plastic or polymer blend suitable for prolonged exposure to a water flow and various operating temperatures. The polymeric body may allow the user to install the faucet in applications where lead content in water flow is regulated or prohibited.

Referring to FIG. 3, centerset valve 100 is shown mounted within a body (e.g., valve body, non-metallic valve body, valve yoke, etc.), shown as centerset yoke 300. According to an exemplary embodiment, the centerset yoke 300 may be made from a non-metallic material, such as a polymeric material. In various embodiments, the faucet assembly includes one centerset yoke 300 for each centerset valve 100 included in the faucet assembly. In various embodiments, centerset yoke 300 includes an opening, shown as longitudinal opening 305 disposed at partially therein. According to an exemplary embodiment, the longitudinal opening is disposed centrally within the centerset yoke 300 (e.g., a central longitudinal opening). In various exemplary embodiments, longitudinal opening 305 is configured to receive centerset valve 100 therein, such that centerset valve 100 is located at least partially within the longitudinal opening 305 of centerset yoke 300.

In various embodiments, valve stem 110 of centerset valve 100 is removably coupled to a handle adaptor, shown as handle adaptor 320, which is further coupled to a screw, shown as screw 330, which is further coupled to a handle, shown as handle 335 of the faucet. Handle adaptor 320 may be configured to transfer rotation of handle 335 of the faucet to rotation of valve stem 110. In a traditional faucet assembly, the motion of the valve assembly, and therefore the travel of the handle, is limited by internal mechanisms within the valve assembly. In contrast, handle adaptor 320, according to an exemplary embodiment, includes integrated end stops 340 (e.g., teeth, prongs, protrusions, protuberances, tangs, nubs, etc.) that are configured to mate or be received within corresponding or complementary end stop receiving channels 350 (e.g., slots, grooves, rails, rings, passages, etc.) in centerset yoke 300 of the faucet assembly. In other words, the handle adaptor 320 is rotatably coupled to the centerset yoke 300. The end stops 340 extend laterally outward away from the handle adapter 320. According to an exemplary embodiment, the end stop receiving channels 350 are disposed in an upper portion of the of the centerset yoke 300, although the end stop receiving channels 350 may be disposed along a different portion of the yoke, according to other exemplary embodiments. In some embodiments, end stops 340 are molded into handle adaptor 320, and end stop receiving channels 350 are molded into centerset yoke 300. In various embodiments, the end stop receiving channels 350 define or establish the end point of rotation of centerset valve 100, thereby eliminating the need for internal stop mechanisms within the valve itself. In some embodiments, the use of end stops 340 and end stop receiving channels 350 allows centerset yoke 300 to be smaller in size than a yoke of a traditional faucet assembly, which is particularly advantageous in a manufacturing environment to eliminate costly material usage.

Still referring to FIG. 3, centerset yoke 300 may be configured to fit within a bonnet, shown as centerset bonnet 360, which may be intended to provide a structural shell for a portion of the faucet assembly. The centerset bonnet 360 can be removably coupled to the centerset yoke 300. According to an exemplary embodiment, handle adaptor 320 includes two end stops 340, which are coplanar, disposed approximately one-hundred and eighty degrees apart (i.e., diametrically opposed), and where each have an angular travel of approximately ninety degrees. According to another embodiment, end stops 340, are disposed approximately one-hundred and eighty degrees apart and each have an angular travel of approximately one-hundred and twenty degrees. In typical valve assemblies, an angular travel of approximately ninety degrees fully articulates the valve assembly from an open position to a closed position, and vice versa. For example a "quarter-turn" valve has an angular travel of approximately ninety degrees.

According to an exemplary embodiment, handle adaptor 320 includes two end stops 340. However, according to other exemplary embodiments, handle adaptor 320 includes only one end stop 340, or may include three, four, or more end stops 340. In some embodiments, end stops 340 are disposed on different planes and/or at other locations of handle adaptor 320. For example, one end stop 340 may be positioned proximate the valve assembly side of handle adaptor 320 while another end stop 340 may be positioned within the middle section of handle adaptor 320. According to an exemplary embodiment, end stops 340 are disposed one-hundred and eighty degrees apart on handle adaptor 320. However, in other embodiments, other angular spatial configurations are possible. For example, end stops 340 may be disposed forty-five degrees apart or ninety degrees apart.

In a typical faucet, the valve cartridge contains an external thread pattern which may be threaded into the body of the faucet to retain the valve cartridge in place. According to an exemplary embodiment, centerset valve 100 is retained within longitudinal opening 305 of centerset yoke 300 through the use of a retaining element, shown as retaining clip 370 in FIG. 3. In some embodiments, the location where centerset valve 100 is retained within longitudinal opening 305 of centerset yoke 300 is referred to as a valve housing nest. Retaining clip 370 may be configured to locate and retain centerset valve 100 along a longitudinal direction relative to centerset yoke 300 of the faucet assembly. The retaining clip 370 can limit the longitudinal movement of the centerset valve 100 relative to the centerset yoke 300. Through the use of retaining clip 370, assembly of the faucet assembly is expedited and simplified, decreasing manufacturing costs. In some embodiments, the use of retaining clip 370 facilitates a reduction in height of the faucet assembly facilitating greater aesthetic design flexibility. According to the exemplary embodiment shown, retaining clip 370 has a substantially U-shaped configuration, and is configured to be removably inserted or slidably received into a corresponding slot or a plurality of slots (e.g., openings, etc.) disposed within a side portion of the yoke 300 (see, for example, slots 800 of FIG. 9). The retaining clip 370 can limit longitudinal movement of the valve 100 within the centerset yoke 300 by sandwiching the valve 100 between the retaining clip 370 and an inner lower wall of the centerset yoke 300. The retaining clip 370 is accessible at an outer surface of the centerset yoke 300 to further simplify the assembly process.

According to another exemplary embodiment, a cap can be ultrasonically welded within or on top of the opening of centerset yoke 300 in order to secure centerset valve 100 within the body. According to another alternative embodiment, a retaining nut can be threaded into the opening of centerset yoke 300 to hold centerset valve 100 in place. In various assembly operations, centerset valve 100 may be automatically inserted into centerset yoke 300 and retained using one of retaining clip 370, a cap ultrasonically welded within or on top of the opening of centerset yoke 300, and/or a retaining nut threaded into the opening of centerset yoke 300. In various embodiments, the use of one of the retaining clip 370, the cap ultrasonically welded, and the retaining nut decreases faucet assembly time (e.g., cycle time, etc.) and increases product consistency compared to traditional faucet assemblies, which typically include a variable torque operation.

FIG. 3 also illustrates the rectangular profiles of end stops 340 and end stop receiving channels 350, according to an exemplary embodiment. In order to provide for alternative embodiments, as discussed above in regards to utilizing multiple end stops 340 and/or multiple end stop receiving channels 350, centerset yoke 300 may need to extend further into centerset bonnet 360 to provide additional space for the added component.

In addition, FIG. 3 illustrates an upper O-ring 307 disposed around an upper portion of the handle adapter 320, and a lower O-ring 309 disposed around a lower portion of the handle adapter 320, adjacent an inner wall of the centerset yoke 300. The upper O-ring 307 and the lower O-ring 309 can be used as frictional elements to provide a desired level of rotational resistance to any mass, geometry and/or orientation of the handle 335. In this manner, the upper O-ring 307 and the lower O-ring 309 can provide for a custom faucet configuration having a particular tactile response for a user.

According to an exemplary embodiment, centerset bonnet 360 is intended to removably couple to centerset yoke 300 via a locking mechanism. As shown in FIGS. 3-4, centerset bonnet 360 includes a down, turn-and-snap feature to locate, orientate, and snap into or engage a profile, shown as snap profile 400, located on centerset yoke 300. Through the use of centerset bonnet 360 and snap profile 400, assembly of the faucet assembly is expedited and simplified, thereby decreasing manufacturing costs. In various embodiments, centerset bonnet 360 is coupled to centerset yoke 300 through rotation of centerset bonnet 360 onto centerset yoke 300. In one embodiment, snap profile 400 is molded on centerset yoke 300. According to the exemplary embodiment shown in FIGS. 3-4, the locking mechanism includes a ring extending inwardly from an inner wall of the centerset yoke 300, shown as inner ring 410, with a plurality of locking features extending radially inward toward a center of the bonnet 360, shown as locking features 420, which engage or are received within corresponding slots within snap profile 400 of centerset yoke 300. In one embodiment, one of centerset bonnet 360 and centerset yoke 300 include a detent defining an end of a rotational travel of centerset bonnet 360 on centerset yoke 300. In one embodiment, the rotational travel of centerset bonnet 360 on centerset yoke 300 is one-hundred and twenty degrees. In another embodiment, the rotational travel of centerset bonnet 360 on centerset yoke 300 is ninety degrees. In some embodiments, locking features 420 may take the form of different shapes and profiles. In other embodiments, inner ring 410 does not have a constant diameter, and instead has a ramped section where the width of inner ring 410 progressively increases to provide a progressively tighter fit with centerset yoke 300. In some embodiments, a plurality of inner rings 410 are included to couple centerset bonnet 360 to centerset yoke 300. In one embodiment, inner ring 410 and locking features 420 are molded on centerset bonnet 360. The use of snap profile 400, inner ring 410, and/or locking features 420 may provide improved reliability and serviceability of the faucet assembly compared to a traditional faucet assembly. In some embodiments, the assembly of centerset bonnet 360 onto centerset yoke 300 can be fully automated. In various embodiments, the use of centerset bonnet 360 and centerset yoke 300 facilitates the implementation of symmetric and non-symmetric handle aesthetics.

Figure 2:
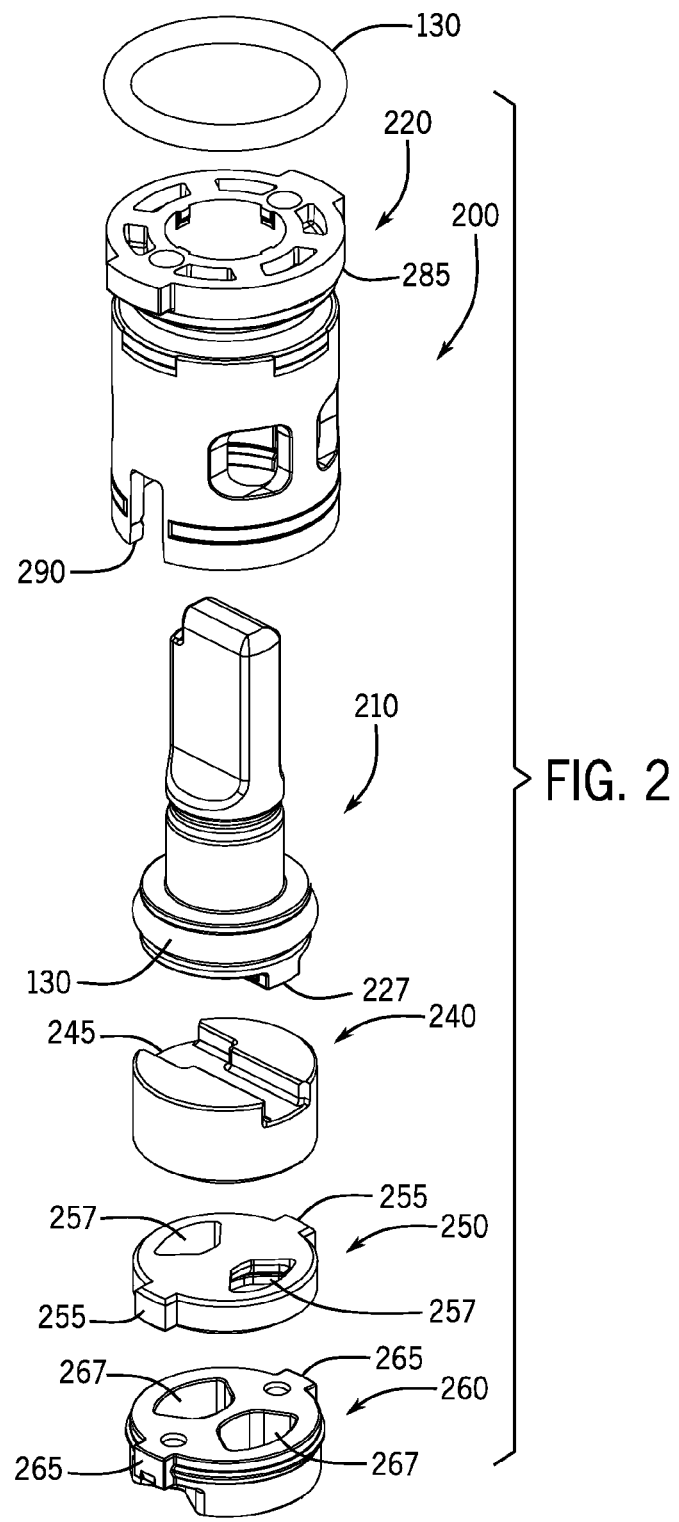
FIG. 2 is a perspective view of another valve, according to an exemplary embodiment of the present disclosure.
Figure 5:
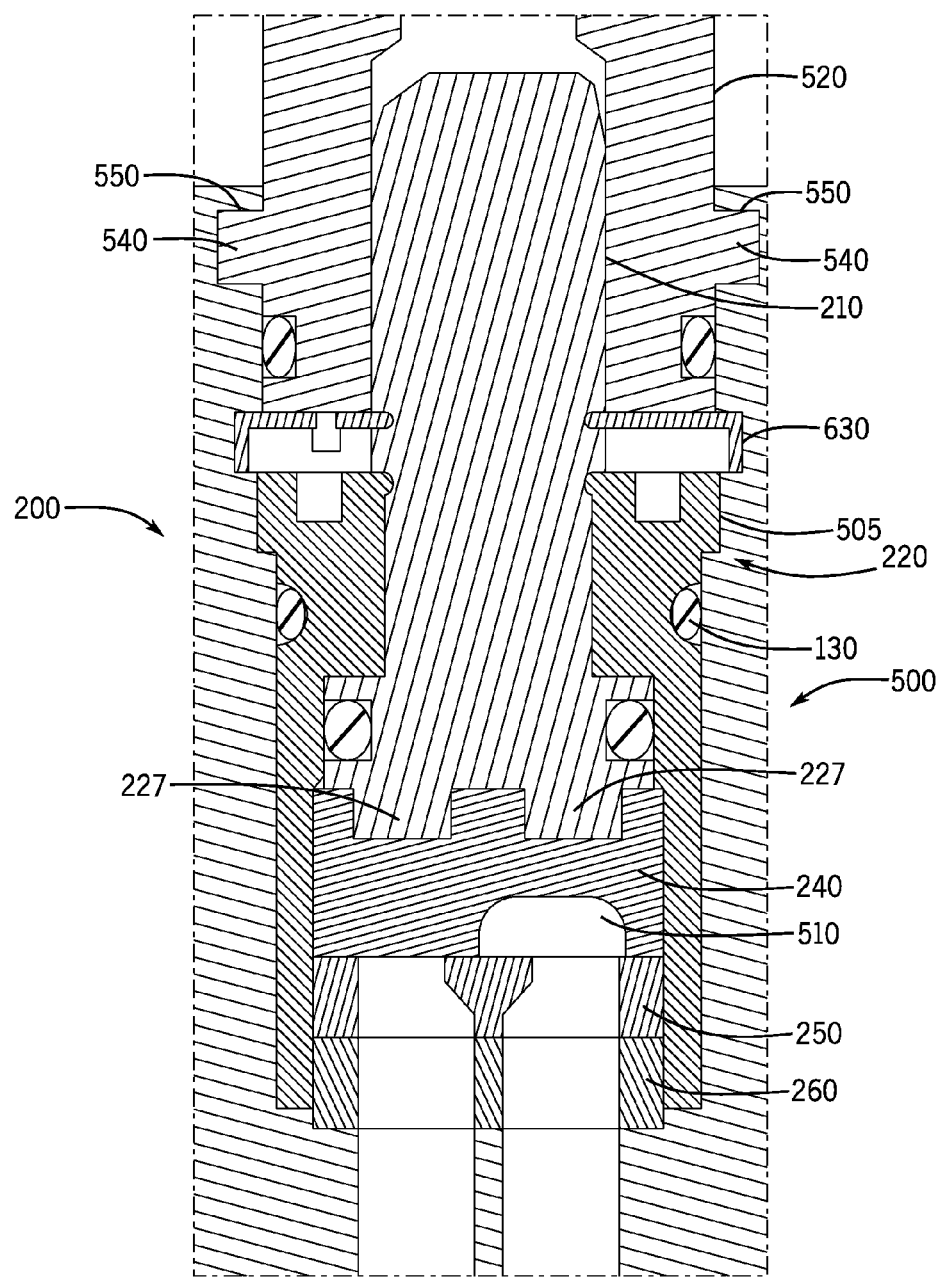
FIG. 5 is a cross-sectional view of a faucet assembly including the valve shown in FIG. 2, according to an exemplary embodiment of the present disclosure.
Figure 6:
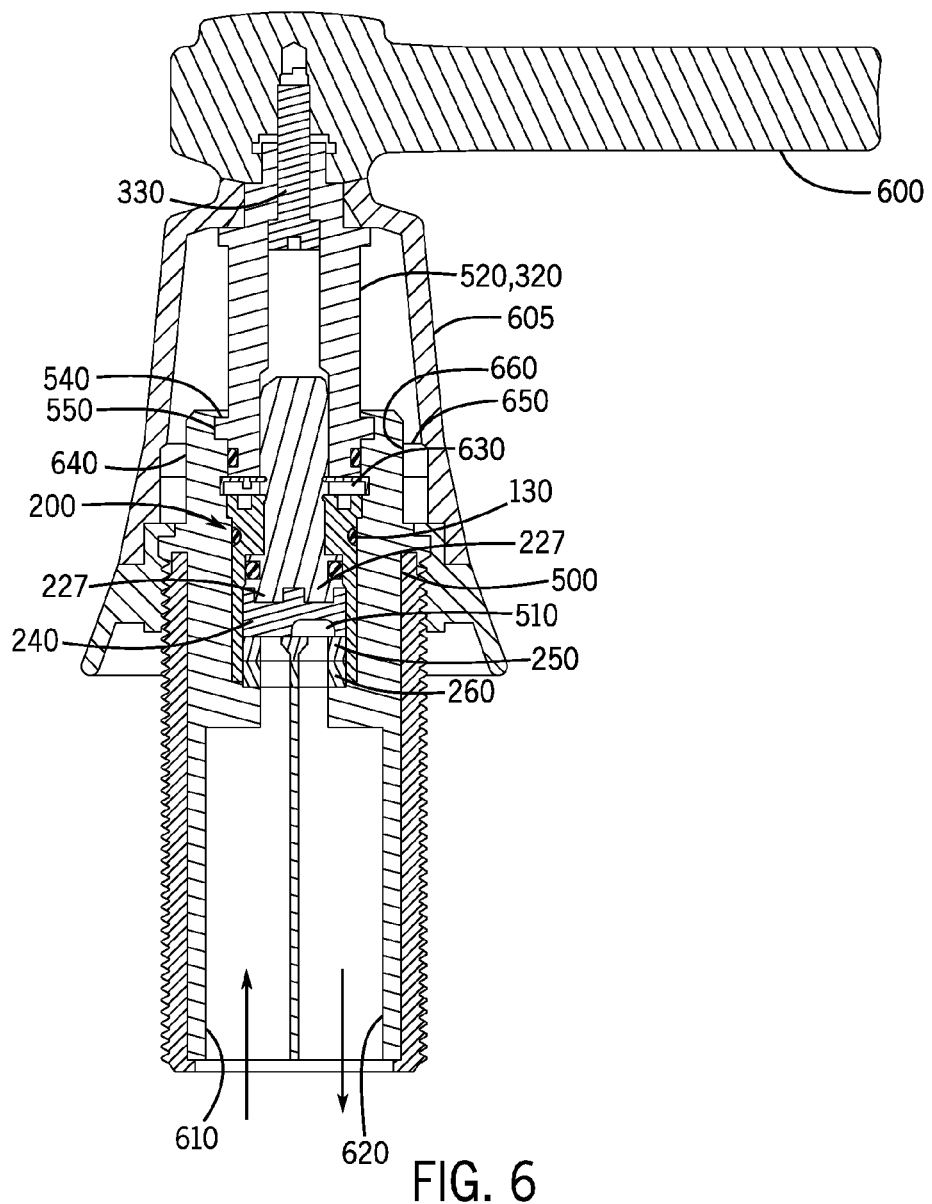
FIG. 6 is an enlarged cross-sectional view of the faucet assembly shown in FIG. 5.

FIG. 2 and FIGS. 5-6, illustrate a valve (e.g., valve cartridge, etc.), shown as widespread valve 200, for use for controlling a supply of water within a faucet assembly according to an exemplary embodiment. Widespread valve 200 may include seals 130, a stem (e.g., valve stem, etc.), shown as valve stem 210, a body (e.g., valve body, etc.), shown as valve body 220, a disc (e.g., metering disc, etc.), shown as movable disc 240, another disc (e.g., metering disc, etc.), shown as stationary disc 250, and yet another disc (e.g., metering disc, etc.), shown as stationary disc 260. Valve body 220 may include a channel, shown as channel 285, configured to receive seal 130, and a plurality of slots, shown as slots 290. Valve stem 210 may include a protrusion, shown as projection 227. Movable disc 240 may include a channel, shown as channel 245, configured to interact with projection 227, such that rotation of valve stem 210 is transferred to movable disc 240 from projection 227 through channel 245. Stationary disc 250 may include a number of protrusions, shown as tabs 255, configured to interact with slot 290 such that rotation of valve stem 210 does not translate to rotation of stationary disc 250. Stationary disc 260 may include a number of protrusions, shown as tabs 265, configured to interact with slot 290 such that rotation of valve stem 210 does not translate to rotation of stationary disc 260. Tabs 255 and 265 may be substantially aligned when stationary disc 250 and stationary disc 260 are installed within valve body 220 and slot 290. Stationary disc 250 may include a number of holes, shown as apertures 257. Stationary disc 260 may include a number of holes, shown as apertures 267. Apertures 257 and apertures 267 may be substantially aligned when stationary disc 250 and stationary disc 260 are installed within valve body 220 and slot 290.

According to an exemplary embodiment, widespread valve 200 is a bottom discharge valve. Widespread valve 200 may have a fluid inlet through stationary disc 260, stationary disc 250, and movable disc 240, and may have a fluid outlet through stationary disc 260, stationary disc 250, and movable disc 240. In other words, a supply of water may be received and transmitted in opposing directions one-hundred and eighty degrees apart through the widespread valve 200. In some applications, a bottom discharge valve, such as widespread valve 200, is advantageous because it provides a fluid connection for some widespread faucet plumbing constructions. In some embodiments, widespread valve 200 is a dry stem valve.

In operation, rotation of valve stem 210 may result in rotation of movable disc 240. Movable disc 240 is operable between an open position, where a supply of water is facilitated through widespread valve 200, and a closed position, where the supply of water is prohibited through widespread valve 200.

Referring to FIGS. 5-6, widespread valve 200 is shown mounted within a body (e.g., valve body, non-metallic valve body, valve yoke, etc.), shown as widespread yoke 500. According to an exemplary embodiment, the widespread yoke 500 is made from a non-metallic material, such as a polymeric material. In various embodiments, the faucet assembly includes one widespread yoke 500 for each widespread valve 200 included in the faucet assembly. In various embodiments, widespread yoke 500 includes an opening, shown as longitudinal opening 505. According to an exemplary embodiment, longitudinal opening 505 is centrally located within the widespread yoke 500. In various exemplary embodiments, longitudinal opening 505 is configured to receive widespread valve 200, such that widespread valve 200 is located or disposed at least partially within longitudinal opening 505 of widespread yoke 500. In some embodiments, when apertures 257 and apertures 267 are substantially aligned, a first channel and a second channel through stationary disc 250 and stationary disc 260 are formed. Widespread yoke 500 may be configured to receive a bottom discharge valve or a side discharge valve, according to various exemplary embodiments.

In one embodiment, movable disc 240 includes a recess, shown as recess 510, sized to fluidly connect the first channel and second channel in stationary disc 250 and stationary disc 260 at a target position. Rotation of movable disc 240 may result in rotation of the recess within movable disc 240. At the target position, recess 510 in movable disc 240 may fluidly connect the first channel and second channel in stationary disc 250 and stationary disc 260 establishing a fluid pathway through the valve. Water may flow through the fluid pathway until movable disc 240 is rotated such that recess 510 no longer facilitates a fluid pathway between the first channel and second channel in stationary disc 250 and stationary disc 260. In various embodiments, movable disc 240, stationary disc 250, and/or stationary disc 260 are constructed from various materials such as brass, aluminum, polymeric material, thermoset, polymeric based blend, polymer, nylon, rubber, synthetic rubber, polyvinyl chloride, polytetrafluoroethylene, ceramic, ceramic blend, ceramic-metallic blend, alumina, metallic blend, zinc, alloy, brass, aluminum, steel, or any other suitable material, such that the faucet assembly may be tailored for a target application.

In various embodiments, valve stem 210 of widespread valve 200 is removably coupled to a handle adaptor, shown as handle adaptor 520, which is further coupled to a screw, shown as screw 530, which is further coupled to a handle, shown as handle 600 of the faucet. Handle adaptor 520 may be configured to transfer rotation of handle 600 of the faucet to rotation of valve stem 210. In a traditional faucet assembly, the motion of the valve assembly, and therefore the travel of the handle, is limited by internal mechanisms within the valve assembly. In contrast, handle adaptor 520, according to an exemplary embodiment, includes integrated end stops 540 (e.g., teeth, prongs, protrusions, protuberances, tangs, nubs, etc.) that are configured to mate within corresponding end stop receiving channels 550 (e.g., slots, grooves, rails, rings, passages, etc.) in widespread yoke 500 of the faucet assembly. The end stops 540 may extend laterally outward away from the handle adaptor 520. The end stop receiving channels 550 may be disposed within an upper portion of the widespread yoke 500. In some embodiments, end stops 540 are molded into handle adaptor 520, and end stop receiving channels 550 are molded into widespread yoke 500. In various embodiments, end stop receiving channels 550 define the end point of the rotation of widespread valve 200 thereby eliminating the need for internal stop mechanisms within the valve assembly. In some embodiments, the use of end stops 540 and end stop receiving channels 550 allows widespread yoke 500 to be smaller in size than a yoke of a traditional faucet assembly.

Widespread yoke 500 may be configured to fit within a bonnet, shown as widespread bonnet 605, which may be intended to provide a structural shell for a portion of the faucet assembly. The bonnet 605 may be removably coupled to the widespread yoke 500. According to an exemplary embodiment, handle adaptor 520 includes two end stops 540, which are coplanar, disposed approximately one-hundred and eighty degrees apart (i.e., diametrically opposed), and where each have an angular travel of approximately ninety degrees. According to another embodiment, end stops 540, are disposed approximately one-hundred and eighty degrees apart and each have an angular travel of approximately one-hundred and twenty degrees. In typical valve assemblies, an angular travel of approximately ninety degrees fully articulates the valve assembly from open to closed, and vice versa. For example a "quarter-turn" valve has an angular travel of approximately ninety degrees.

According to an exemplary embodiment, handle adaptor 520 includes at least two end stops 540. However, according to various embodiments, handle adaptor 520 includes only one end stop 540, or may include three, four, or more end stops 540. In some embodiments, end stops 540 are disposed on different planes and at other locations of handle adaptor 520. For example, one end stop 540 may be positioned proximate the valve assembly side of handle adaptor 520 while another end stop 540 may be positioned within the middle section of handle adaptor 520. According to an exemplary embodiment, end stops 540 are disposed one-hundred and eighty degrees apart on handle adaptor 520. However, in other embodiments, other angular spacing configurations are possible. For example, end stops 540 may be disposed forty-five degrees apart or ninety degrees apart.

As shown in FIG. 6, widespread yoke 500 may include a first channel, shown as first yoke channel 610, and a second channel, shown as second yoke channel 620. In one embodiment, water flows into widespread valve 200 through first yoke channel 610 and water flows out of widespread valve 200 through second yoke channel 620. In an alternative embodiment, water flows into widespread valve 200 through second yoke channel 620 and water flows out of widespread valve 200 through first yoke channel 610. According to an exemplary embodiment, each of the first yoke channel 610 and the second yoke channel 620 are configured to couple individually to one of the channels in stationary disc 250 and stationary disc 260. In one embodiment, water flow occurs in one direction through first yoke channel 610 and occurs in an opposing direction through second yoke channel 620.

According to an exemplary embodiment, widespread valve 200 is retained within longitudinal opening 505 of widespread yoke 500 through the use of a retaining element, shown as retaining clip 630. In some embodiments, the location where widespread valve 200 is retained within longitudinal opening 505 of widespread yoke 500 is referred to as a valve housing nest. Retaining clip 630 may be configured to locate and retain widespread valve 200 in place relative to widespread yoke 500 of the faucet assembly. The retaining clip 630 can limit the longitudinal movement of the widespread valve 200 relative to the widespread yoke 500. Through the use of retaining clip 630, assembly of the faucet assembly is expedited and simplified, decreasing manufacturing costs. In some embodiments, the use of retaining clip 630 facilitates a reduction in height of the faucet assembly facilitating greater aesthetic design flexibility. In some embodiments, the use of retaining clip 630 facilitates a reduction in height of the faucet assembly facilitating greater aesthetic design flexibility. According to the exemplary embodiment shown, retaining clip 630 has a substantially U-shaped configuration, and is configured to be inserted or slidably received into a corresponding slot or a plurality of slots (e.g., openings, etc.) disposed within a side portion of the widespread yoke 500. The retaining clip 630 can limit longitudinal movement of the widespread valve 200 within the widespread yoke 500 by sandwiching the valve 200 between the retaining clip 630 and an inner lower wall of the widespread yoke 500. The retaining clip 630 may be accessible at an outer surface of the widespread yoke 500 to further facilitate the assembly process.

According to another exemplary embodiment, a cap can be ultrasonically welded within or on top of the opening of widespread yoke 500 in order to secure widespread valve 200 within the body. According to another alternative embodiment, a retaining nut can be threaded into the opening of widespread yoke 500 to hold widespread valve 200 in place. In various assembly operations, widespread valve 200 may be automatically inserted into widespread yoke 500 and retained using one of retaining clip 630, the cap ultrasonically welded within or on top of the opening of widespread yoke 500, and the retaining nut threaded into the opening of widespread yoke 500. In various embodiments, the use of one of the retaining clip 630, the cap ultrasonically welded, and the retaining nut decreases faucet assembly time (e.g., cycle time, etc.) and increases product consistency compared to traditional faucet assemblies, which typically include a variable torque operation.

According to an exemplary embodiment, widespread bonnet 605 is intended to removably couple to widespread yoke 500 via a locking mechanism. In one embodiment, the locking mechanism utilizes a down, turn-and-snap feature to locate, orientate, and snap into or engage a profile, shown as snap profile 640, on widespread yoke 500. Through the use of widespread bonnet 605 and snap profile 640, assembly of the faucet assembly is expedited and simplified, decreasing manufacturing costs. In various embodiments, widespread bonnet 605 is coupled to widespread yoke 500 through a rotation of widespread bonnet 605 onto widespread yoke 500. In one embodiment, snap profile 640 is molded on widespread yoke 500. According to an exemplary embodiment, the locking mechanism includes a ring disposed on an inner wall of the widespread bonnet 605, shown as inner ring 650, with a plurality of locking features extending radially inward from the inner ring 650 toward the center of the widespread bonnet 605, shown as locking features 660, on widespread bonnet 605 which are received within or engage corresponding slots within snap profile 640 of widespread yoke 500. In one embodiment, one of widespread bonnet 605 and widespread yoke 500 include a detent defining an end of a rotational travel of widespread bonnet 605 on widespread yoke 500. In one embodiment, the rotational travel of widespread bonnet 605 on widespread yoke 500 is one-hundred and twenty degrees. In another embodiment, the rotational travel of widespread bonnet 605 on widespread yoke 500 is ninety degrees. In some embodiments, locking features 660 may take the form of different shapes and profiles. In other embodiments, inner ring 650 does not have a constant diameter and instead has a ramped section where the width of inner ring 650 progressively increases to provide a progressively tighter fit with widespread yoke 500. In some embodiments, a plurality of inner rings 650 are included for securing widespread bonnet 605 to widespread yoke 500. In one embodiment, inner ring 650 and locking features 660 are molded on widespread bonnet 605. The use of snap profile 640, inner ring 650, and/or locking features 660 may provide improved reliability and serviceability of the faucet assembly compared to a traditional faucet assembly. In some embodiments, the assembly of widespread bonnet 605 onto widespread yoke 500 can be fully automated. In various embodiments, the use of widespread bonnet 605 and widespread yoke 500 facilitates the implementation of symmetric and non-symmetric handle aesthetics.

Figure 7:
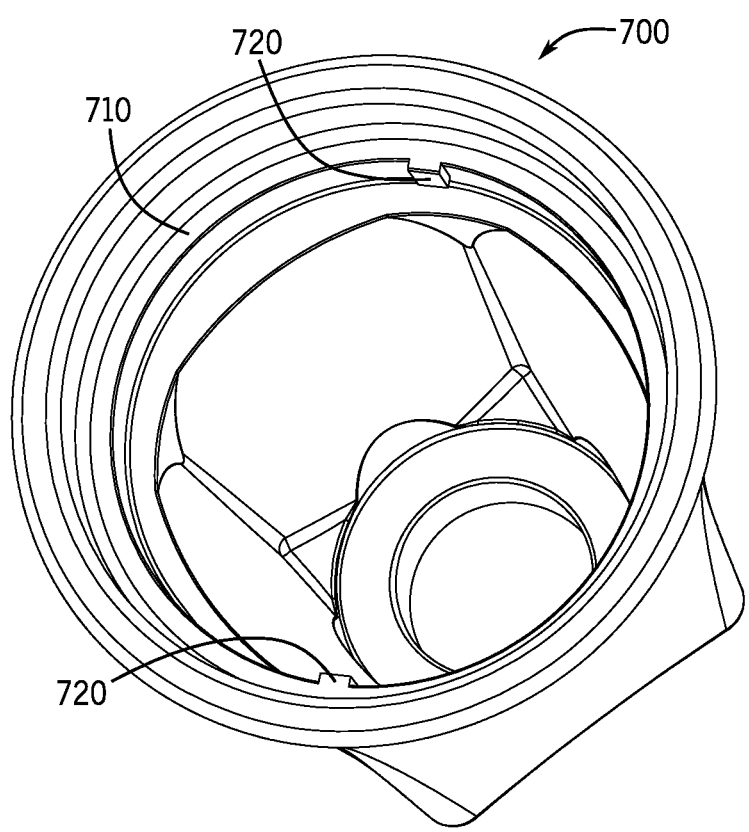
FIG. 7 is a perspective view of a bonnet for a faucet assembly, according to an exemplary embodiment of the present disclosure, and a traditional bonnet including inner threads.

FIG. 7 illustrates the differences between a bonnet of the present disclosure, shown as bonnet 700, and a traditional bonnet (shown on the right side of FIG. 7). Bonnet 700 is shown to include a ring, shown as inner ring 710, and locking features, shown as locking features 720. Bonnet 700 may be centerset bonnet 360 or widespread bonnet 605, and therefore may receive centerset yoke 300 or widespread yoke 500. Accordingly, inner ring 710 may be inner ring 410 or inner ring 650, and locking features 720 may be locking features 420 or locking features 660, respectively. In contrast, the traditional bonnet may include inner threads that provide a threaded connection to a yoke. By replacing the inner threads with inner ring 710 (e.g., inner ring 410, inner ring 650) and locking features 720 (e.g., locking features 420, locking features 660), bonnet 700 simplifies the assembly process and decreases manufacturing costs associated with manufacturing of the faucet assembly. Inner ring 710 (e.g., inner ring 410, inner ring 650) and locking features 720 (e.g., locking features 420, locking features 660) may be integrally formed on bonnet 700 during formation of bonnet 700, or may be subsequently attached to bonnet 700 in a screw-processing step. For example, inner ring 710 (e.g., inner ring 410, inner ring 650) and locking features 720 (e.g., locking features 420, locking features 660) may be attached to bonnet 700 by ultrasonic welding.

Figure 8:
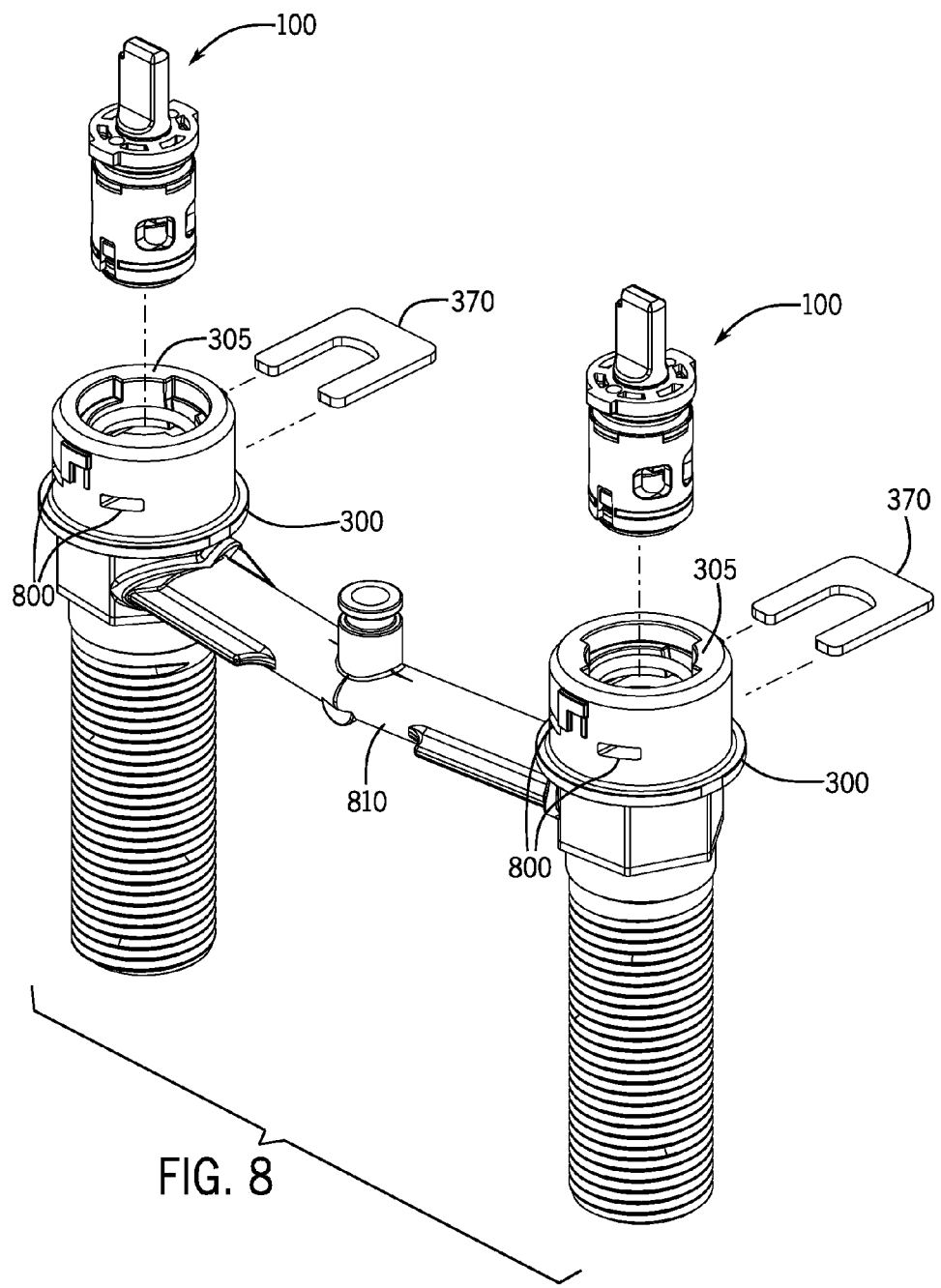
FIG. 8 is a perspective exploded view of a faucet subassembly, according to an exemplary embodiment of the present disclosure.
Figure 9:
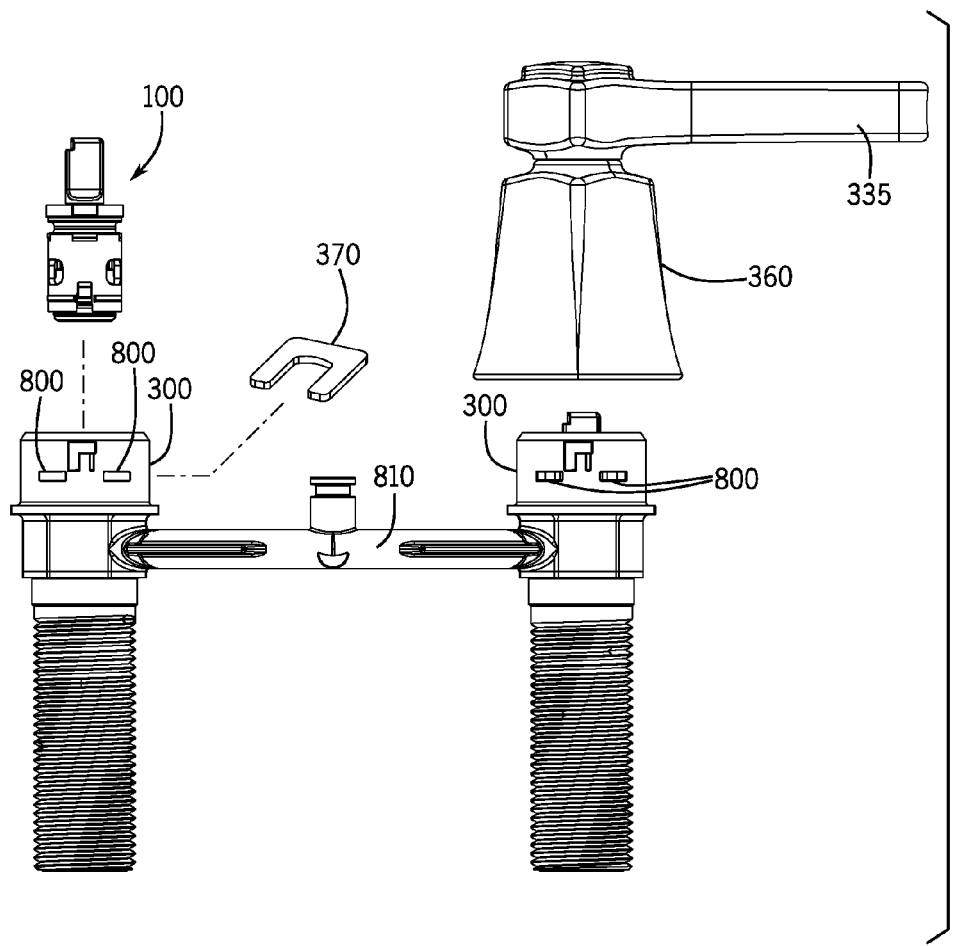
FIG. 9 is another perspective exploded view of the faucet subassembly shown in FIG. 8.

Referring now to FIGS. 8-9, centerset yoke 300 includes a plurality of slots (e.g., holes, openings, etc.), shown as slots 800. According to various embodiments, retaining clip 370 is configured to be inserted or slidably received at least partially through slots 800 in centerset yoke 300 to retain centerset valve 100 within longitudinal opening 305 of centerset yoke 300. While slots 800 may not be explicitly shown in all FIGURES, it is understood that slots 800 may be incorporated within centerset yoke 300 and/or widespread yoke 500 in various faucet assemblies. Slots 800 may be of various shapes, sizes, and configurations such that the interaction between centerset yoke 300, slots 800, retaining clip 370, and centerset valve 100 secures centerset valve 100 within longitudinal opening 305 of centerset yoke 300. Similarly, slots 800 may be of various shapes, sizes, and configurations such that the interaction between widespread yoke 500, slots 800, retaining clip 630, and widespread valve 200 secures widespread valve 200 within longitudinal opening 505 of widespread yoke 500. In some embodiments, centerset yoke 300 and/or widespread yoke 500 includes a circumferential groove disposed coplanar to slots 800 such that retaining clip 370 and/or retaining clip 630 may be received in the circumferential groove. In one embodiment, a connector, shown as waterway connector 810, is provided between individual centerset yokes 300 such that a side discharge valve (e.g., centerset valve 100, etc.) may be used in the faucet assembly. In other embodiments, centerset valve 100 is a bottom discharge valve, and the faucet assembly may not include waterway connector 810.

Figure 10:
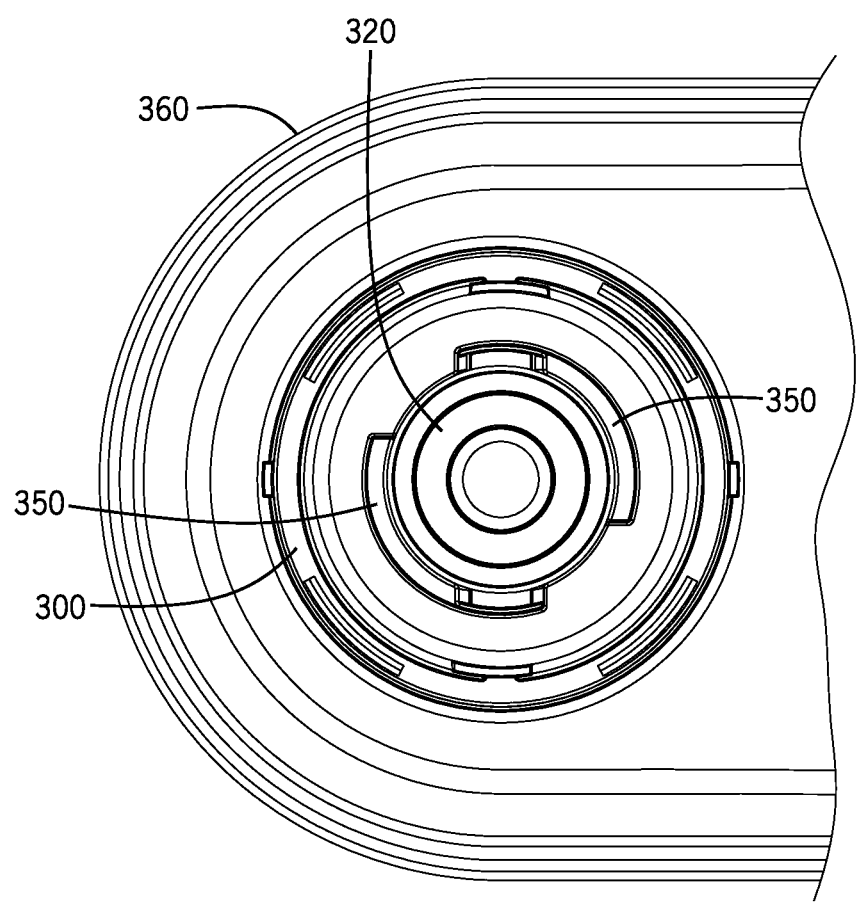
FIG. 10 is a top perspective view of a faucet subassembly, according to an exemplary embodiment of the present disclosure.

As shown in FIG. 10, centerset yoke 300 includes end stop receiving channels 350. According to various embodiments, the angular travel of end stops 340 can be increased or decreased depending on valve assembly configurations and the needs of the user. Increasing or decreasing the angular position of end stops 340 may correspondingly increase or decrease the travel of handle 335, which may be manipulated by a user. In some applications, it may desirable for the handles of a faucet assembly to require less manipulation to achieve a desired output of the valve assembly. For example, decreasing the overall angular travel may impose an intentionally designed limit on the output of the valve assembly. According to various embodiments, different valve assemblies are utilized in the faucet that have different angular travel required to fully articulate. According to these embodiments, end stop receiving channels 350 may have angular travels that are sized to permit the full range of motion of the valve assembly via manipulation of the handle by the user. According to various embodiments, end stop receiving channels 350 have an angular travel less than approximately ninety degrees and have an angular travel of, for example, seventy-five degrees, sixty degrees, forty-five degrees, thirty degrees, or other suitable angular travel. According to other various embodiments, end stop receiving channels 350 have an angular travel greater than approximately ninety degrees and have an angular travel of, for example, one-hundred and eighty degrees, one-hundred and thirty-five degrees, one-hundred and twenty degrees, one-hundred degrees, or other suitable angular travel. In an embodiment, handle adaptor 320 includes only one end stop 340 and one end stop receiving channel 350 that facilitates an angular travel of any suitable distance.

According to an exemplary embodiment, the profiles of end stop 340 and end stop receiving channel 350 are configured to substantially mate and the profiles of end stop 340 and end stop receiving channel 350 are configured to be generally rectangular in shape. According to various exemplary embodiments, the profiles of end stop 340 and end stop receiving channel 350 can be square, triangular, rounded, substantially semicircular, or have other suitable profiles. The profile of end stop 340 may be different than the profile of corresponding end stop receiving channel 350. For example, end stop 340 may have a square profile while end stop receiving channel 350 may have a rectangular profile. In another embodiment, end stop 340 has a substantially rounded profile while end stop receiving channel 350 has a square or rectangular profile. Further, according to various exemplary embodiments, the profiles of end stop 340 and end stop receiving channel 350 are configured to incorporate a specified amount of play between end stop 340 and end stop receiving channel 350.

According to various alternative embodiments, the interface between end stops 340 and end stop receiving channels 350 is configured to provide torsional resistance to the rotation of handle adaptor 320. In order to increase the torsional resistance of the interface between end stops 340 and end stop receiving channels 350, different profiles, sizes, and combinations of end stops 340 and end stop receiving channels 350 may be employed. In one alternative embodiment, end stop receiving channels 350 provide a vertical displacement of end stops 340 during the angular travel of end stops 340 to provide a torsional resistance.

Figure 11:
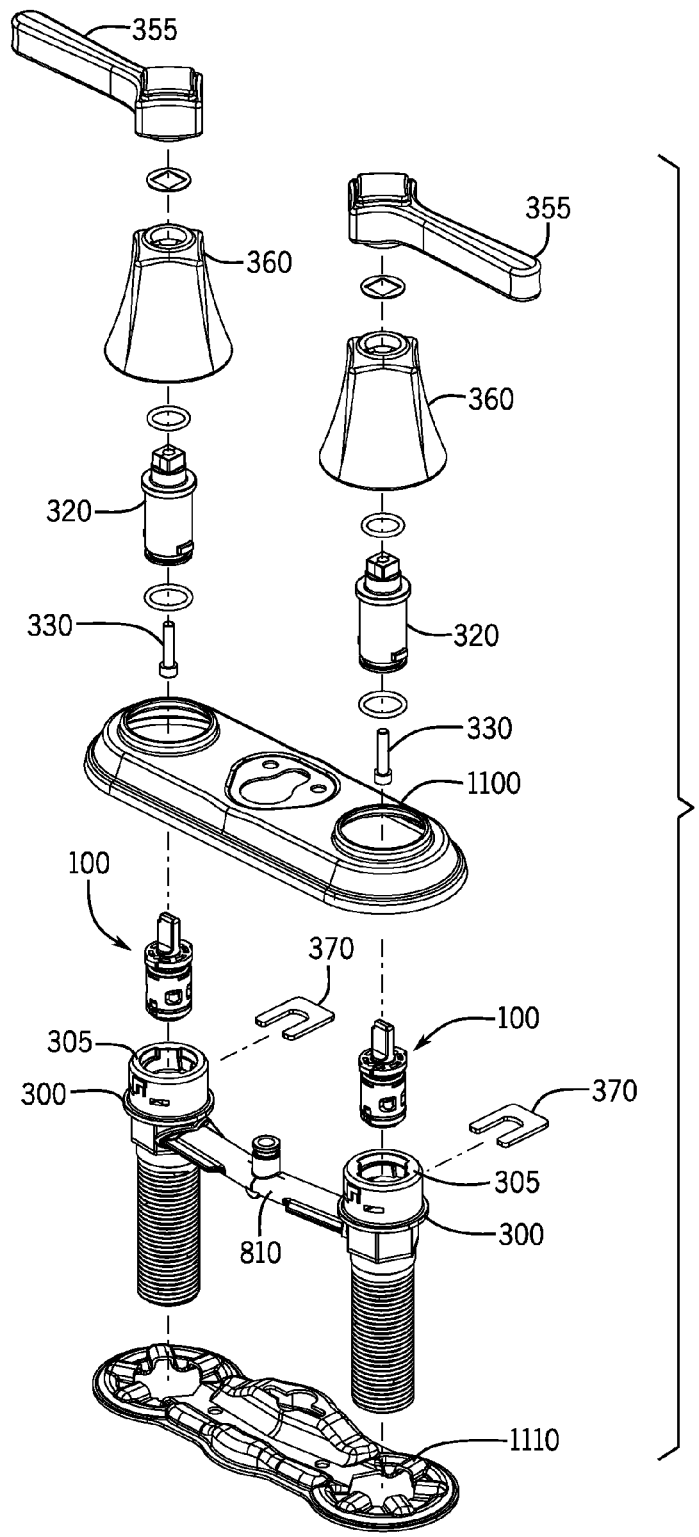
FIG. 11 is a perspective exploded view of another faucet subassembly, according to an exemplary embodiment of the present disclosure.

As shown in FIG. 11, a faucet subassembly includes centerset valves 100, handles 335, screws 330, handle adaptors 320, centerset bonnets 360, centerset yokes 300, retaining clips 370, waterway connector 810, a first plate, shown as escutcheon plate 1100, and a second plate, shown as yoke plate 1110. In the embodiment shown in FIG. 11, the handle 335 is removably coupled to the handle adaptor 320 via a screw 330, which is inserted through a bottom portion of the handle adapter 320.

Figure 12:
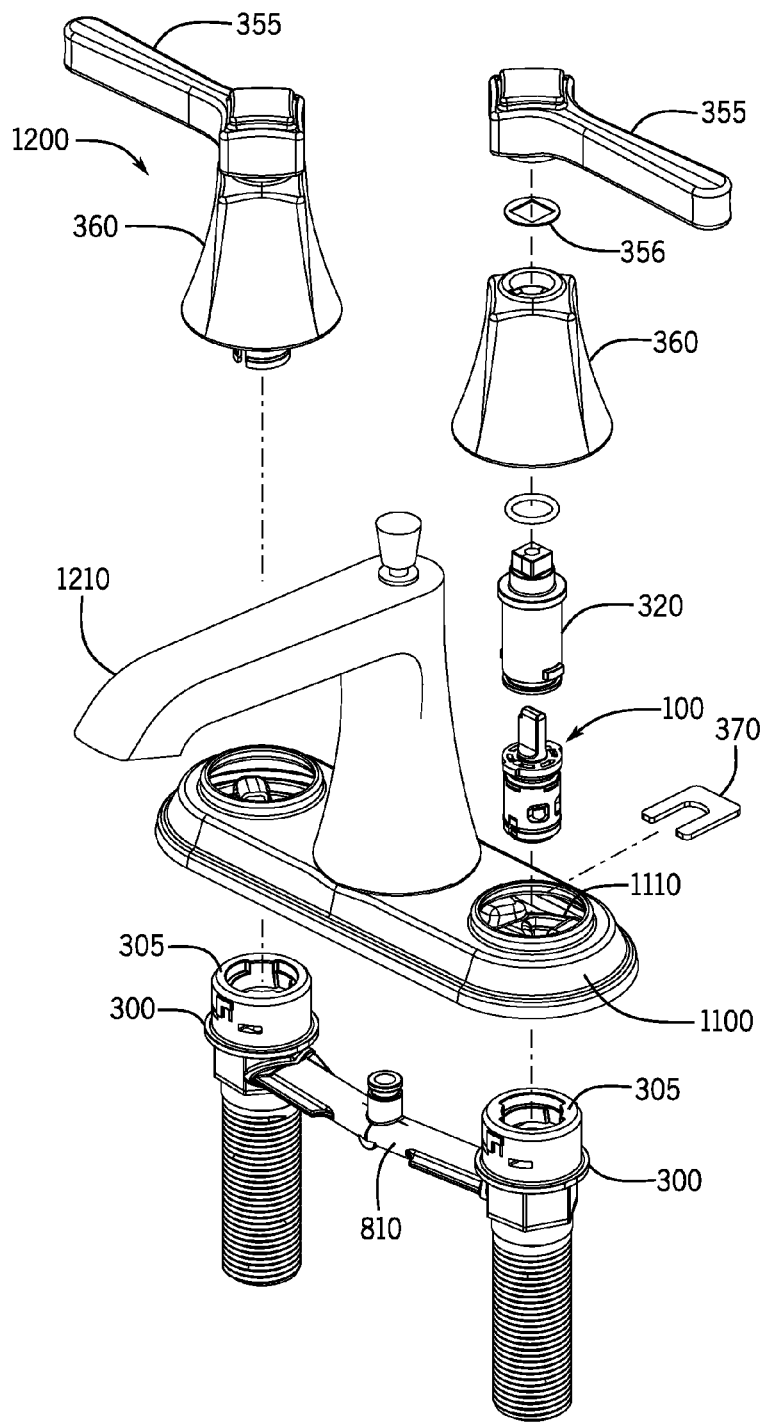
FIG. 12 is a perspective exploded view of a faucet assembly, according to an exemplary embodiment of the present disclosure.

Referring to FIG. 12, a faucet assembly, shown as centerset faucet assembly 1200 is shown. Centerset faucet assembly 1200 includes centerset valves 100, handles 355, handle adaptors 320, centerset bonnets 360, centerset yokes 300, retaining clips 370, waterway connector 810, escutcheon plate 1100, yoke plate 1110, and a faucet, shown as centerset faucet 1210. In the embodiment shown in FIG. 12, handle 355 is removably coupled to centerset bonnet 360 via an interference fit (e.g., press-fit, etc.) between a portion of the handle and the handle adapter 320 (e.g., a protrusion, a stem, etc.). For example, the handle 355 can include a protrusion that extends downwardly therefrom, and is configured to be inserted into handle adaptor 320. In this manner, rotation of handle 355 will cause a corresponding rotation of handle adapter 320, which thereby rotates centerset valve 100. Additionally, handle 355 can be snapped into place within the bonnet 360 via the clip 356, thereby eliminating the need for a screw (e.g., screw 330 of FIG. 11) for coupling the handle and simplifying the assembly process.

Figure 13:
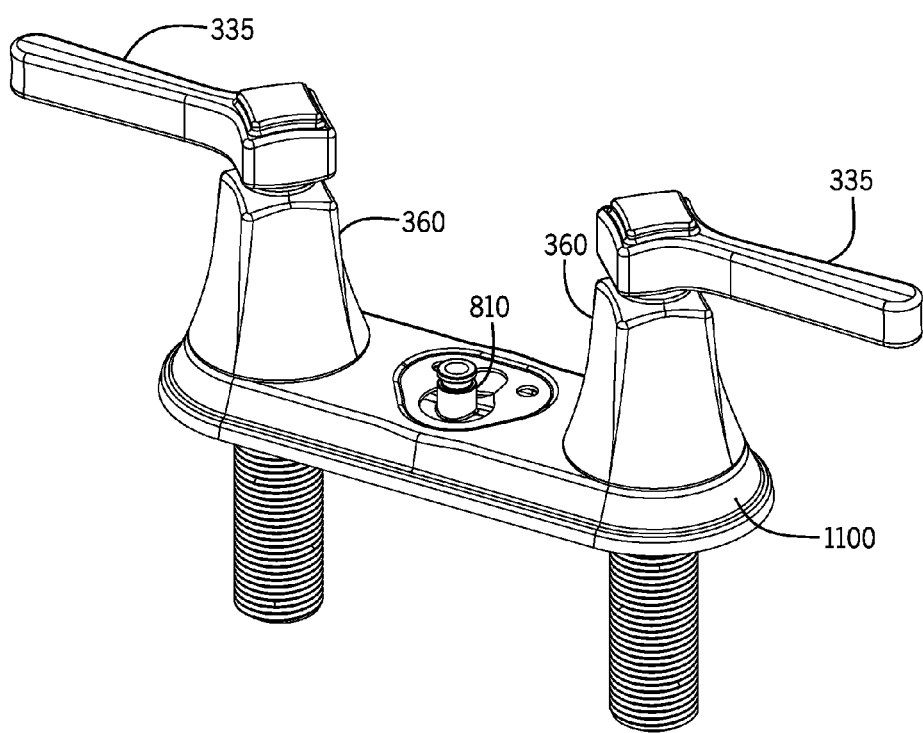
FIG. 13 is a perspective exploded view of another faucet subassembly, according to an exemplary embodiment of the present disclosure.

According to an embodiment shown in FIG. 13, when installed, escutcheon plate 1100 may be configured to substantially cover (e.g., conceal from view, etc.) waterway connector 810. Further, escutcheon plate 1100 may include a central opening corresponding to a central connection point on waterway connector 810, such that a faucet, such as centerset faucet 1210, may be installed to waterway connector 810 to provide mixed water to a user.

Figure 14:
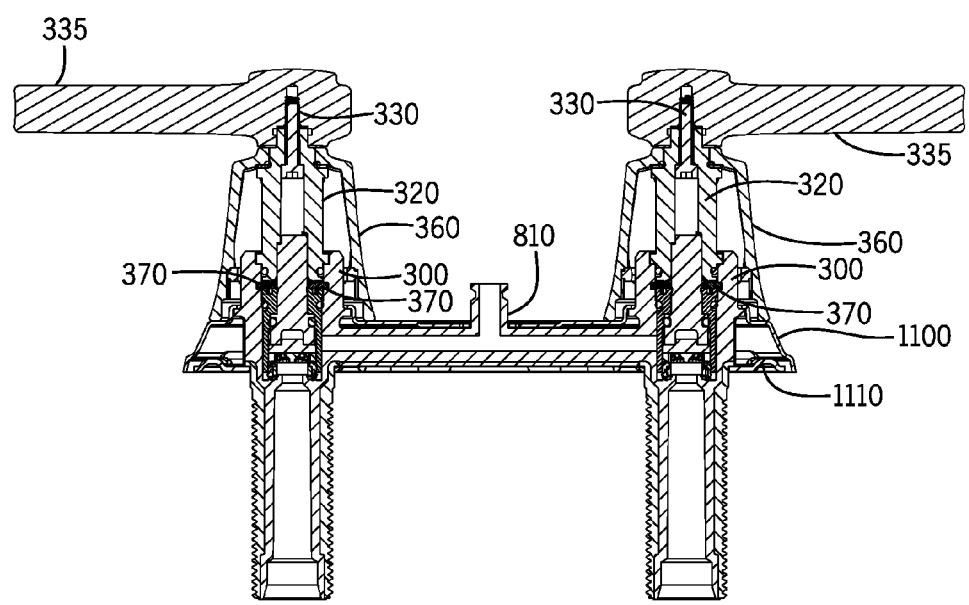
FIG. 14 is a cross-sectional view of the faucet subassembly shown in FIG. 13.
Figure 15:
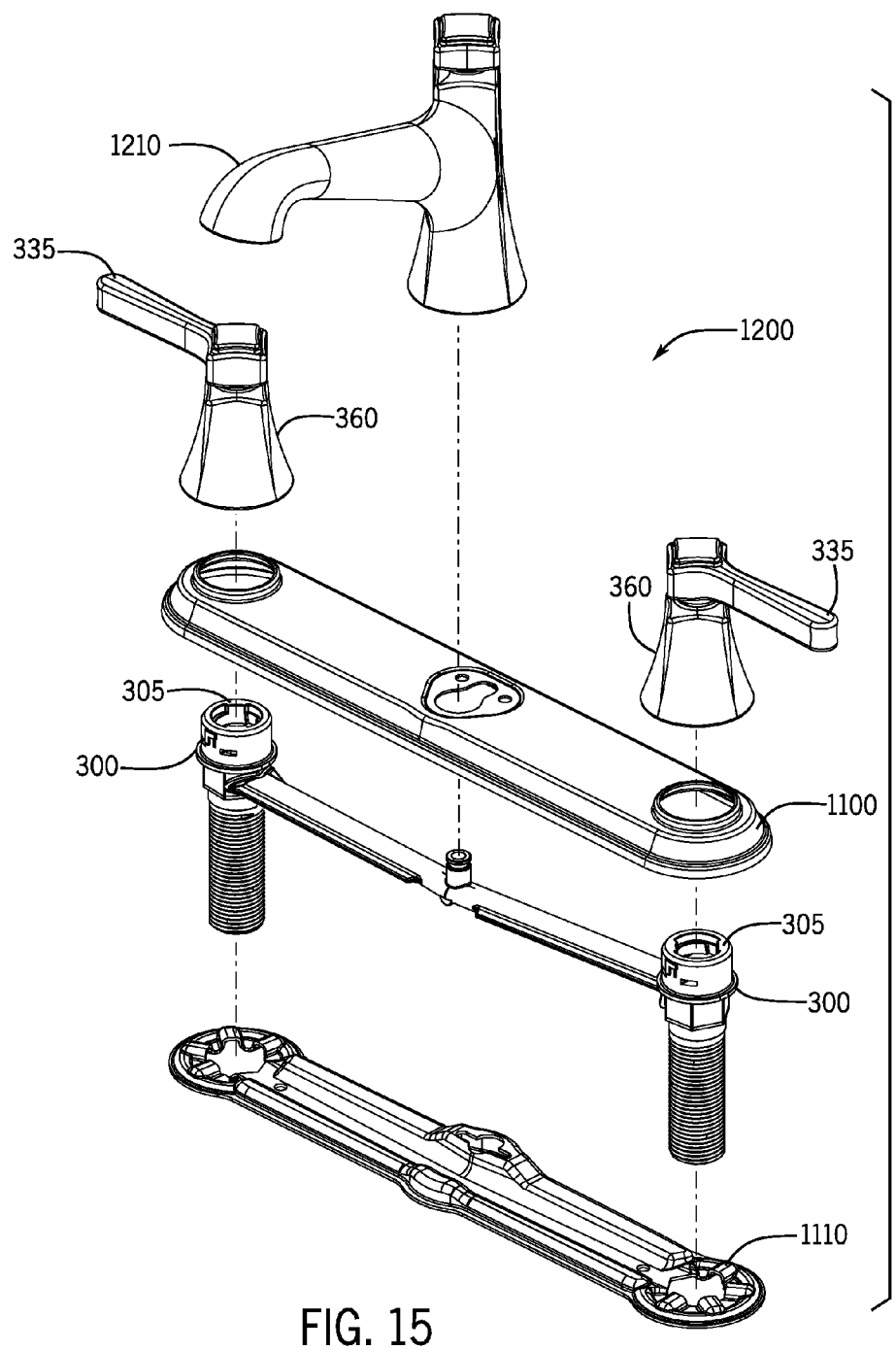
FIG. 15 is a perspective exploded view of another faucet subassembly, according to an exemplary embodiment of the present disclosure.

FIG. 14 illustrates a cross-section view of a faucet subassembly including two handle assemblies each including centerset yoke 300, handle adaptor 320, screw 330, handle 335, and centerset bonnet 360. In the embodiment shown in FIG. 14, the handle assemblies are attached (e.g., snapped, connected, etc.) to individual centerset yokes 300 through the use of an interlocking threaded interface on centerset yoke 300 and centerset bonnet 360. The handle assemblies may be utilized in either the centerset or widespread faucet design, thereby decreasing manufacturing time and cost (e.g., by eliminating additional tooling, additional parts, etc.). FIG. 15 illustrates another example of centerset faucet assembly 1200 including centerset yokes 300, handles 335, centerset bonnets 360, waterway connected 810, escutcheon plate 1100, yoke plate 1110, centerset faucet assembly 1200, and centerset faucet 1210.

Figure 16:
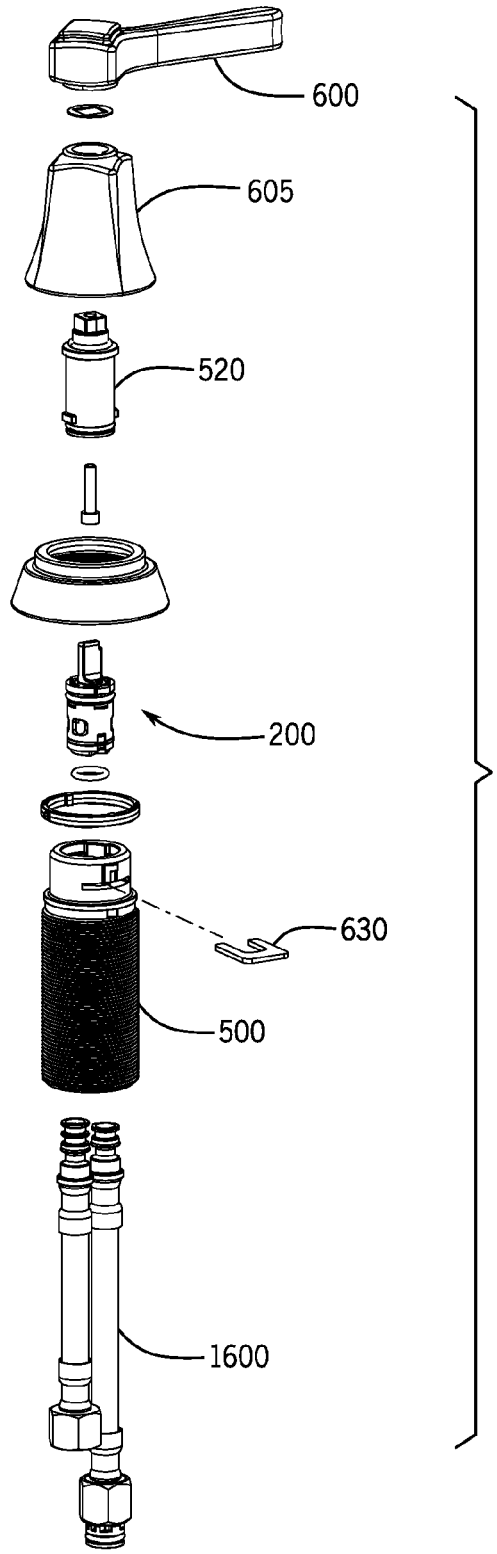
FIG. 16 is a perspective exploded view of a faucet subassembly, according to an exemplary embodiment of the present disclosure.
Figure 17:
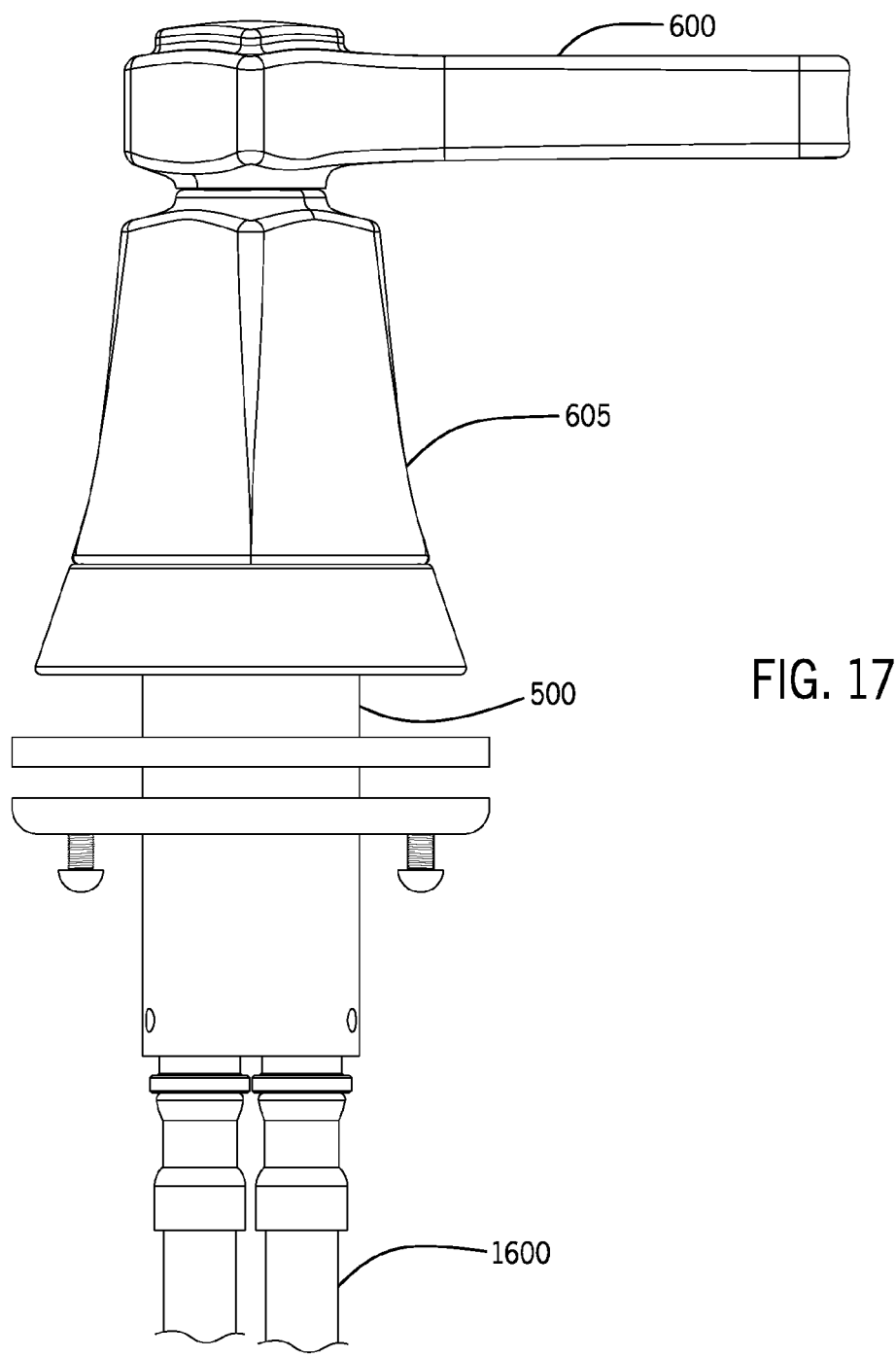
FIG. 17 is a perspective view of the faucet subassembly shown in FIG. 16.
Figure 18:
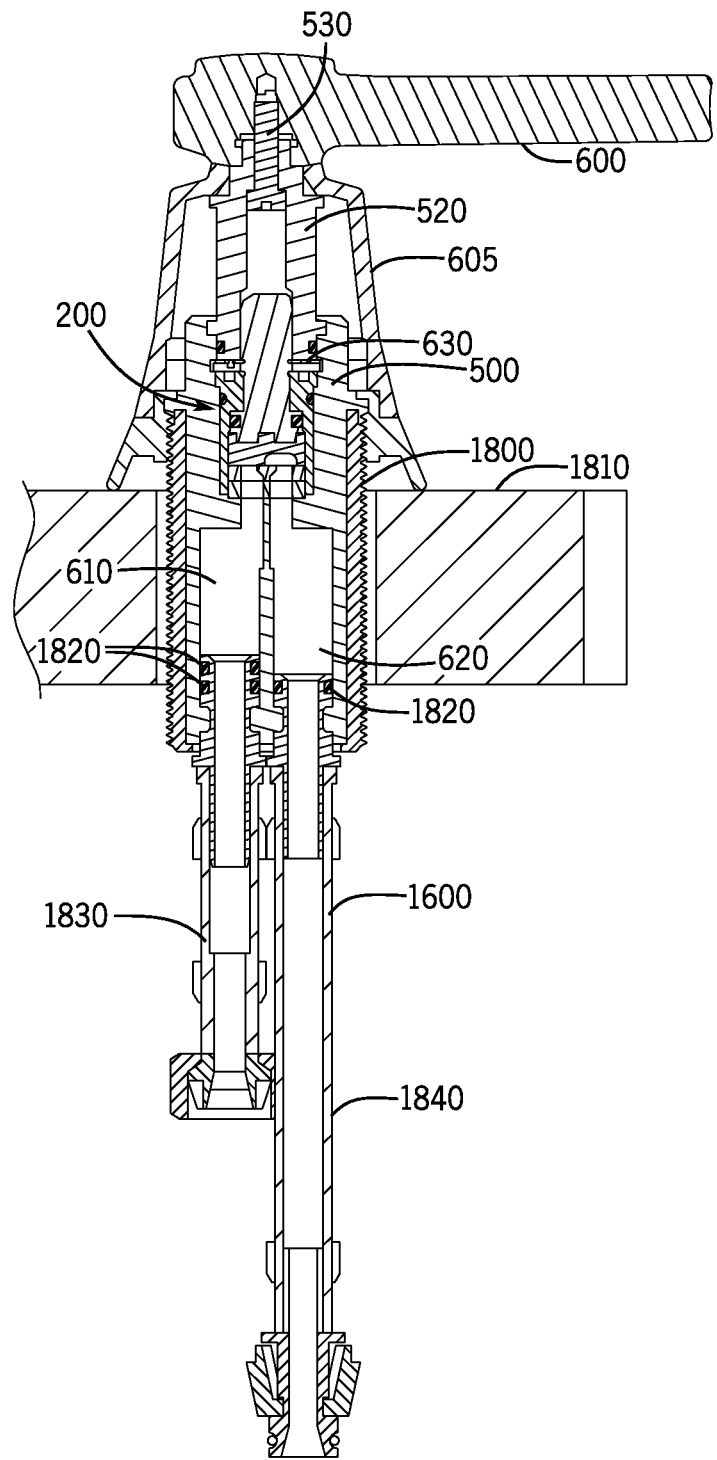
FIG. 18 is a cross-sectional view of the faucet subassembly shown in FIG. 16.

As shown in FIGS. 16-18, a plumbing network, shown as plumbing network 1600, is coupled to widespread yoke 500. In the embodiment shown in FIG. 16, the handle assembly (i.e., handle 600, bonnet 605, handle adapter 520, and screw 530) is the same handle assembly shown in the embodiment of FIG. 11. In other words, the handle assembly of FIG. 11 is designed to be interchangeable for use in other faucet assembly configurations, such as between a centerset and widespread faucet configuration. In one embodiment, widespread yoke 500 and plumbing network 1600 are configured such that widespread valve 200 is a bottom discharge valve. Plumbing network 1600 may have an inlet hose and an outlet hose. The inlet hose may be the supply hose. The outlet hose may be the spout hose. The inlet hose may transport water into widespread yoke 500 and the outlet hose may transport water from widespread yoke 500. In various embodiments, water flows from the outlet hose of plumbing network 1600 to a mixing hose, where water from the outlet hose and water from another outlet hose are mixed and provided to a faucet, such as centerset faucet 1210. In one embodiment, plumbing network 1600 replaces waterway connector 810. For example, as shown in FIG. 13, widespread bonnet 605 is installed on widespread yoke 500, and to include handle 600 and plumbing network 1600.

Referring to FIG. 18, a subassembly for a faucet is shown to include widespread valve 200, widespread yoke 500, handle adaptor 520, screw 530, handle 600, widespread bonnet 605, retaining clip 630, and plumbing network 1600. According to an exemplary embodiment, widespread yoke 500 includes a shell, shown as mounting shell 1800 which is configured to mount widespread yoke 500 to a surface (e.g., counter, countertop, wall, panel, etc.), shown as deck 1810. Mounting shell 1800 may be used to secure an entire faucet assembly to deck 1810. In various embodiments, mounting shell 1800 of widespread yoke 500 further includes a plurality of holes configured to accept a plurality of pins (e.g., spring pins, tension pins, etc.), shown as roll pins 1820, that are configured to secure plumbing network 1600 to widespread yoke 500. In one embodiment, plumbing network 1600 includes a first hose, shown as first hose 1830, and a second hose, shown as second hose 1840. In one embodiment, each of first hose 1830 and second hose 1840 are secured into widespread yoke 500 through the use of two roll pins 1820. In various embodiments, first hose 1830 supplies water to the faucet subassembly and is the inlet while second hose 1840 removes water from the faucet subassembly and is the outlet. In another embodiment, both first hose 1830 and second hose 1840 are secured in widespread yoke 500 through interfacing with mounting shell 1800.

Figure 19:
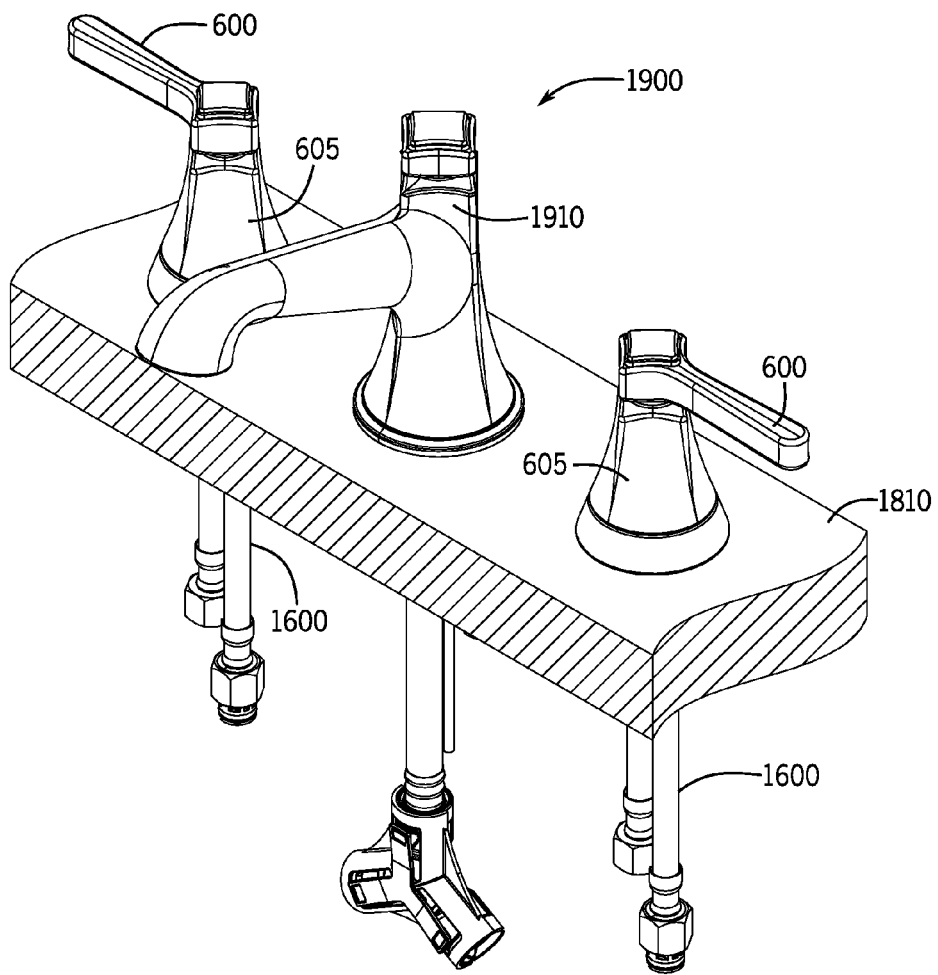
FIG. 19 is a perspective view of a faucet assembly, according to an exemplary embodiment of the present disclosure.
Figure 20:
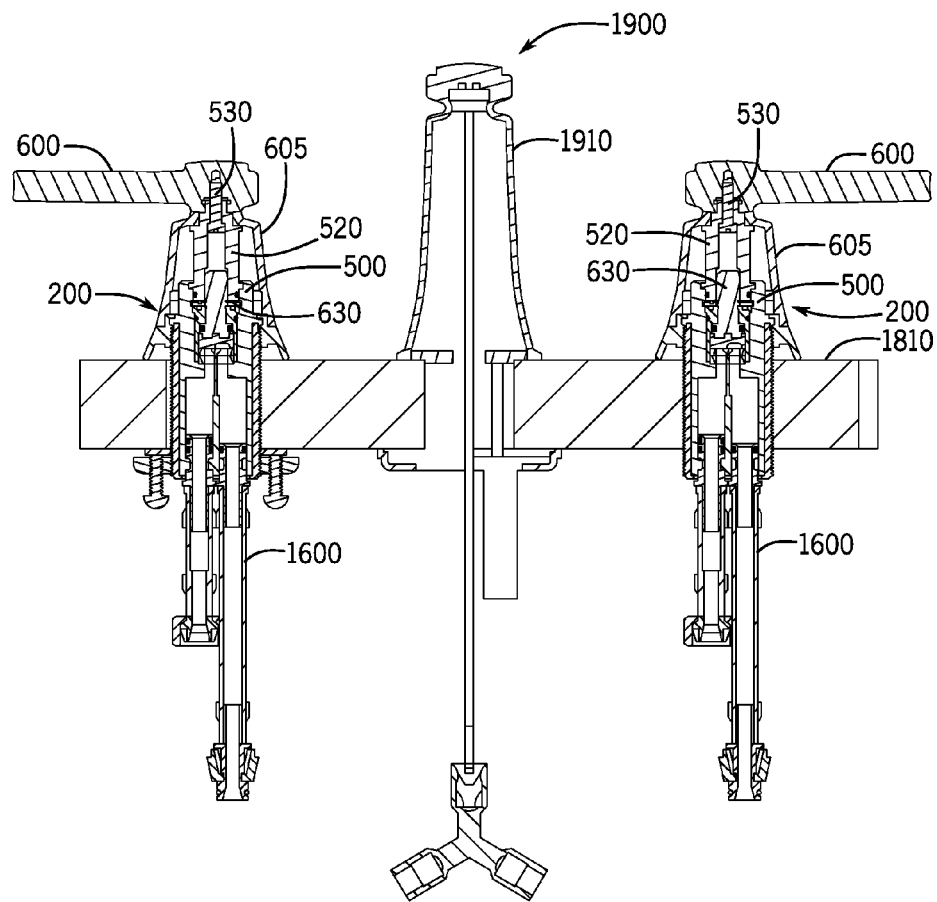
FIG. 20 is a cross-sectional view of the faucet assembly shown in FIG. 19.

Referring to FIGS. 19-20, a faucet assembly, shown as widespread faucet assembly 1900, is shown to include widespread valve 200, widespread yoke 500, handle adaptor 520, screw 530, handle 600, widespread bonnet 605, retaining clip 630, plumbing network 1600, and a faucet, shown as widespread faucet 1910, and is shown mounted to deck 1810. In FIG. 20, a cross-sectional view of widespread faucet assembly 1900, is shown.

According to various embodiments, centerset faucet assembly 1200 includes a combination of centerset valve 100, valve stem 110, valve body 120, seal 130, centerset yoke 300, longitudinal opening 305, handle adaptor 320, screw 330, handle 335, end stop 340, end stop receiving channels 350, centerset bonnet 360, retaining clip 370, snap profile 400, inner ring 410, locking features 420, escutcheon plate 1100, yoke plate 1110, centerset faucet 1210, and deck 1810. In some embodiments, widespread faucet assembly 1900 includes a combination of widespread valve 200, valve stem 210, valve body 220, projection 227, movable disc 240, channel 245, stationary disc 250, projection 255, apertures 257, stationary disc 260, tabs 265, apertures 267, channel 285, slots 290, widespread yoke 500, longitudinal opening 505, recess 510, handle adaptor 520, screw 530, end stop 540, end stop receiving channels 550, handle 600, widespread bonnet 605, first yoke channel 610, second yoke channel 620, retaining clip 630, snap profile 640, inner ring 650, locking features 660, bonnet 700, slots 800, waterway connector 810, plumbing network 1600, mounting shell 1800, deck 1810, roll pins 1820, first hose 1830, second hose 1840, and widespread faucet 1910. According to some embodiments, components described for one of centerset faucet assembly 1200 and widespread faucet assembly 1900 may be incorporated into the other of centerset faucet assembly 1200 and widespread faucet assembly 1900. Similarly, it is understood that similar components may be interchangeably incorporated into centerset faucet assembly 1200 and widespread faucet assembly 1900 to achieve similar tasks. For example, it is understood that in some embodiments, centerset yoke 300 and widespread yoke 500 may be interchangeably incorporated into centerset faucet assembly 1200 and widespread faucet assembly 1900.

In various embodiments, centerset valve 100, valve stem 110, valve body 120, seal 130, centerset yoke 300, handle adaptor 320, screw 330, handle 335, end stop 340, centerset bonnet 360, retaining clip 370, inner ring 410, locking features 420, escutcheon plate 1100, yoke plate 1110, centerset faucet 1210, deck 1810, widespread valve 200, valve stem 210, valve body 220, projection 227, movable disc 240, stationary disc 250, projection 255, stationary disc 260, tabs 265, widespread yoke 500, recess 510, handle adaptor 520, screw 530, end stop 540, handle 600, widespread bonnet 605, retaining clip 630, inner ring 650, locking features 660, bonnet 700, inner ring 710, locking features 720, waterway connector 810, plumbing network 1600, mounting shell 1800, deck 1810, roll pins 1820, first hose 1830, second hose 1840, and widespread faucet 1910, and all other faucet assembly components are constructed of any suitable plastic, thermoset, polymeric based blend, polymer, nylon, rubber, synthetic rubber, polyvinyl chloride, polystyrene, metallic blend, zinc, alloy, brass, aluminum, steel, or any other suitable material. According to various embodiments, various components are constructed of varying and/or nonhomogeneous materials. For example, in some embodiments, handle adaptor 520 and end stops 540 are constructed of a rubber blend, while widespread bonnet 605 and widespread yoke 500 are constructed from a plastic compound. In one embodiment, centerset yoke 300 and/or widespread yoke 500 is constructed from a plastic compound. In some embodiments, centerset yoke 300 and/or widespread yoke 500 is formed of a plastic compound through an injection molding process. In various embodiments the aforementioned faucet components are formed through an overmolding process. According to various embodiments, centerset faucet 1210 and/or widespread faucet 1910 is a mono-block lavatory faucet, a bridge style kitchen faucet, a bathfill faucet, and any other suitable types of faucets such that the faucet assembly may be tailored for a target application.

In various embodiments, centerset faucet assembly 1200 and/or widespread faucet assembly 1900 include various suitable hardware components (e.g., crush washers, washers, bushings, spacers, O-rings, etc.).

According to various embodiments, centerset valve 100 is utilized in various faucet assemblies such as mono-block lavatory faucets, bridge style kitchen faucets, bathfill faucets, and other suitable types of faucets such that the faucet assembly may be tailored for a target application.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

While centerset valve 100 and widespread valve 200 have been referenced to control a supply of water, it is understood that other similar fluids could be controlled through the use of centerset valve 100 and widespread valve 200, respectively.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present application.

What is claimed is:

1. A faucet assembly, comprising:
   a non-metallic valve body having a longitudinal opening disposed therein, a slot disposed within a side portion thereof, and a receiving channel disposed within an upper portion thereof;
   a valve at least partially disposed within the longitudinal opening, wherein the valve includes a body and a stem extending upwardly from the body, wherein the stem is configured to rotate relative to the body;
   a handle adapter removably coupled to the stem and rotatably coupled to the non-metallic valve body, wherein the handle adapter includes an end stop extending laterally outward therefrom; and
   a retaining clip removably inserted into the slot of the non-metallic valve body to limit longitudinal movement of the valve within the non-metallic valve body;
   wherein the end stop is configured to be received within the receiving channel to establish a rotational end point for the stem.

2. The faucet assembly of claim 1, further comprising a bonnet removably coupled to the valve body.

3. The faucet assembly of claim 2, wherein the valve body includes a snap profile, and wherein the bonnet includes a locking mechanism configured to engage the snap profile of the valve body to removably couple the bonnet to the valve body.

4. The faucet assembly of claim 3, wherein the locking mechanism includes an inner ring and a plurality of locking features extending radially inward from the inner ring toward a center of the bonnet, and wherein the plurality of locking features are configured to engage the snap profile of the valve body.

5. The faucet assembly of claim 1, wherein the retaining clip is slidably received within the slot of the non-metallic valve body, and wherein the retaining clip is accessible at an outer surface of the non-metallic valve body.

6. The faucet assembly of claim 1, wherein the retaining clip has a generally U-shaped configuration.

7. The faucet assembly of claim 1, wherein the body of the valve is disposed below the retaining clip within the longitudinal opening of the non-metallic valve body.

8. The faucet assembly of claim 1, wherein the valve is one of a bottom discharge valve or a side discharge valve.

9. A faucet assembly, comprising:
 a non-metallic valve body having a longitudinal opening disposed therein and a slot disposed within a side portion thereof;
 a valve at least partially disposed within the longitudinal opening, wherein the valve includes a body and a stem extending upwardly from the body, wherein the stem is configured to rotate relative to the body;
 a handle adapter removably coupled to the stem and rotatably coupled to the non-metallic valve body; and
 a retaining clip removably inserted into the slot of the non-metallic valve body to limit longitudinal movement of the valve within the non-metallic valve body;
 wherein the non-metallic valve body further includes a receiving channel disposed within an upper portion thereof, wherein the handle adapter includes at least two end stops extending laterally outward therefrom that are diametrically opposed and are substantially coplanar, and wherein the at least two end stops are configured to be received within the receiving channel to establish rotational end points for the stem.

10. A faucet assembly, comprising:
 a non-metallic valve body having a central longitudinal opening disposed therein, a slot disposed within a side portion thereof, and a receiving channel disposed within an upper portion thereof;
 a valve at least partially disposed within the central longitudinal opening, wherein the valve includes a body and a stem extending upwardly from the body, wherein the stem is configured to rotate relative to the body;
 a handle adapter removably coupled to the stem and rotatably coupled to the non-metallic valve body, wherein the handle adapter includes an end stop extending laterally outward therefrom, and wherein the handle adapter is configured to control rotational movement of the stem; and
 a retaining clip slidably received within the slot of the non-metallic valve body to retain the valve along a longitudinal direction within the non-metallic valve body;
 wherein the retaining clip is accessible at an outer surface of the valve body; and
 wherein the end stop is configured to be received within the receiving channel to establish a rotational end point for the stem.

11. The faucet assembly of claim 10, further comprising a bonnet including a locking mechanism, wherein the valve body includes a snap profile, and wherein the locking mechanism is configured to engage the snap profile of the valve body to removably couple the bonnet to the valve body.

12. The faucet assembly of claim 11, wherein the locking mechanism includes a ring disposed along an inner wall of the bonnet and a plurality of locking features extending radially inward from the inner ring toward a center of the bonnet, and wherein the plurality of locking features are configured to engage the snap profile of the valve body.

13. The faucet assembly of claim 10, wherein the retaining clip has a generally U-shaped configuration.

14. The faucet assembly of claim 10, wherein the body of the valve is disposed below the retaining clip within the central longitudinal opening of the non-metallic valve body.

15. A faucet assembly, comprising:
 a non-metallic valve body having a central longitudinal opening disposed therein and a slot disposed within a side portion thereof;
 a valve at least partially disposed within the central longitudinal opening, wherein the valve includes a body and a stem extending upwardly from the body, wherein the stem is configured to rotate relative to the body;
 a handle adapter removably coupled to the stem and rotatably coupled to the non-metallic valve body, wherein the handle adapter is configured to control rotational movement of the stem; and
 a retaining clip slidably received within the slot of the non-metallic valve body to retain the valve along a longitudinal direction within the non-metallic valve body;
 wherein the retaining clip is accessible at an outer surface of the valve body;
 wherein the non-metallic valve body further includes a receiving channel disposed within an upper portion thereof, wherein the handle adapter includes at least two end stops extending laterally outward away from the handle adapter, wherein the at least two end stops are diametrically opposed and are substantially coplanar, and wherein the at least two end stops are configured to be received within the receiving channel to establish rotational end points for the stem.

16. A faucet assembly, comprising:
 a non-metallic valve body having a longitudinal opening disposed therein, a slot disposed within a side portion thereof, and a receiving channel disposed within an upper portion thereof;
 a valve at least partially disposed within the longitudinal opening, wherein the valve includes a body and a stem extending upwardly from the body, wherein the stem is configured to rotate relative to the body;
 a handle adapter removably coupled to the stem and rotatably coupled to the non-metallic valve body, wherein the handle adapter includes an end stop extending laterally outward therefrom; and
 a retaining clip removably inserted into the slot of the non-metallic valve body to retain the valve within the non-metallic valve body, wherein the body of the valve is disposed below the retaining clip so as to limit longitudinal movement of the valve relative to the non-metallic valve body;

wherein the end stop is configured to be received within the receiving channel to establish a rotational end point for the stem.

17. The faucet assembly of claim 16, wherein the retaining clip is slidably received within the slot of the non-metallic valve body, and wherein the retaining clip is accessible at an outer surface of the non-metallic valve body.

18. The faucet assembly of claim 16, wherein the retaining clip has a generally U-shaped configuration.

* * * * *